(12) United States Patent
Ariyoshi

(10) Patent No.: US 6,349,084 B1
(45) Date of Patent: Feb. 19, 2002

(54) FLEXIBLE SUPPORT DEVICE

(75) Inventor: Yuji Ariyoshi, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/523,061

(22) Filed: Mar. 9, 2000

(30) Foreign Application Priority Data

Mar. 10, 1999 (JP) .......................................... 11-063008

(51) Int. Cl.[7] .............................................. G11B 33/08
(52) U.S. Cl. ..................................................... 369/263
(58) Field of Search .............................. 369/263, 247, 369/251, 254, 264, 266; 360/98.07, 98.08, 99.12

(56) References Cited

U.S. PATENT DOCUMENTS

| 6,125,097 A | * | 9/2000 | Wu | 369/263 |
| 6,169,718 B1 | * | 2/2001 | Matusi | 369/263 |
| 6,198,715 B1 | * | 3/2001 | Kouno et al. | 369/263 |

FOREIGN PATENT DOCUMENTS

JP 10-188549 7/1998

* cited by examiner

Primary Examiner—Allen Cao
(74) Attorney, Agent, or Firm—Wenderoth, Lind & Ponack, L.L.P.

(57) ABSTRACT

The present invention provides a flexible support device that is easier to assemble, has more consistent damping characteristics when the temperature rises, enables simpler product design, and allows two members to move rotatably relative to each other. A floating bushing 29 is placed between a traverse base 20 having a bushing mounting flange 21b, and a drive base 10 having a traverse base support stud 11. The floating bushing 29 has a first fitting part 29c disposed between first and second damping parts 29a and 29b for fitting to the bushing mounting flange, and a second fitting part 29d formed integrally with a terminal side of the first damping part 29a. The floating bushing 29 is mounted on the traverse base support stud 11 with the second fitting part 29d covering the end 11d of the traverse base support stud 11. A movement limiting part for engaging this end of the traverse base support stud is formed integrally with the second fitting part and thus limits movement of the second fitting part toward the stud end.

4 Claims, 32 Drawing Sheets

FLEXIBLE SUPPORT DEVICE

BACKGROUND OF THE INVENTION

1. Field of the Invention

The present invention relates to a flexible support device disposed between two members provided so as to relatively displaceable to each other.

2. Related Art

A flexible support device 129 disposed between two members 110 and 120 that are provided so as to be relatively displaceable to each other as known from the related art is shown in FIG. 44. As shown in FIG. 44, a first member 120 comprises a flat annular supported part 121. A second member 110 has a columnar supported part 111 substantially orthogonal to the supported part 121 of the first member 120, and is relatively displaceable to the first member 120 in the axial direction of the columnar supported part 111.

The flexible support device 129 disposed between this first member 120 and second member 110 comprises first and second hollow flexible support parts 129a and 129b and a middle fitting part 129c integrally disposed between these flexible support parts 129a and 129b. The flexible support parts 129a and 129b are disposed substantially coaxially and are flexibly displaceable at least in the direction of this axis. The middle fitting part 129c is fit to the supported part 121 of the above-noted first member 120.

The flexible support device 129 is made from a material, such as rubber, with the specified elastic property, and is formed such that the middle fitting part 129c is a constricted neck between the flexible support parts 129a and 129b. The flexible support device 129 is then disposed with the outside circumference part of this middle fitting part 129c fit to a hole 121h in the flat supported part 121 of the first member 120.

When first member 120 and second member 110 are assembled with the supported part 111 of the second member 110 passing through the hole 121h in the supported part 121 of first member 120, and this supported part 121 is then fit to the middle fitting part 129c as described above, the flexible support device 129 is mounted between the first and second members 120 and 110 with the supported part 111 of second member 110 passing through the hollow interior of the flexible support parts 129a and 129b of the flexible support device 129. The second flexible support part 129b is thus positioned between the middle fitting part 129c and the base surface 110f of the second [first, sci] member 110. The first flexible support part 129a is free and unrestrained on one side thereof (the top side as shown in FIG. 44) at this time.

A flat end plate 112 is then fastened to the end of the supported part 111 with the first flexible support part 129a of the flexible support device 129 located between the middle fitting part 129c and end plate 112. The flexible support device 129 is thus disposed between base surface 110f of second member 110 and the end plate 112, and the total length (height) of the flexible support device 129 is thereby limited in the axial direction.

This end plate 112 acts as a load bearing plate (stop) when a load is applied in a direction compressing first flexible support part 129a, and acts to prevent the removal of flexible support device 129 when a great displacement force is applied in a direction causing supported part 121 of first member 120 to separate from the base surface 110f of second member 110. The end plate 112 is therefore typically secured to the end of columnar supported part 111 with a locking pin, threaded member, or similar means (not shown in the figure).

When a vibratory force or impact load causing relative displacement of the first member 120 and second member 110 is applied to the above-described assembly, the damping action accompanying compressive deformation within the elastic limits of the second flexible support part 129b is able to absorb the vibration component or impact load in the direction in which the supported part 121 of first member 120 approaches the base surface 110f of second member 110, i.e., downward as seen in FIG. 44. Vibration components and impact loads in the direction in which the supported part 121 of first member 120 approaches the end plate 112 on the end of supported part 111 of second member 110, i.e., upward in FIG. 44, can be similarly absorbed by the damping action accompanying compressive deformation within the elastic limits of the first flexible support part 129a.

It will thus be obvious that the flexible support parts 129a and 129b exhibit independent damping actions depending upon the direction of an applied load.

As will be known from the above description, a separate end plate 112 must be fastened to the end of the supported part 111 with this conventional flexible support device 129 after the flexible support device 129 is mounted between the first and second members 120 and 110 by fitting the middle fitting part 129c to the flat supported part 121.

A problem with this configuration is that assembling the flexible support device is thus complicated, requiring a greater number of parts and assembly steps. This conventional design is therefore a hindrance to keeping the production cost down.

Furthermore, in the final assembled state, a conventional, typically rubber flexible support device 129 is disposed between end plate 112 and the base surface 110f of a typically plastic or metal second member 110 with the overall length (height) thereof in the axial direction limited by the end plate 112 and second member 110.

A problem arising from this configuration is that the damping action of the flexible support device 129 changes when the temperature rises a certain amount. This is due to the difference in the thermal expansion coefficients of the material used for the second member 110, including the flat supported part 111, and the end plate 112, and the material of the flexible support device 129.

Yet further, the flexible support parts 129a and 129b operate independently to damp an applied load in a conventional flexible support device 129 as described above. When a particularly large load is expected to act in one direction, the flexible support part on the side bearing the load or vibration component must be made particularly large, or a spring or other auxiliary means must be provided to assist the flexible support part.

The problem in either case here is an increase in the size and/or complexity of the flexible support device.

When the first member 120 and second member 110 move circularly relative to each other in this conventional flexible support device 129, it is difficult to achieve a smooth circular motion because a flat end plate 112 is fastened to the end of the supported part 111, and the flexible support device 129 is disposed between this end plate 112 and the base surface 110f of second member 110.

Considering these problems of the related art, a basic object of the present invention is to provide a flexible support device that is easy to assemble; has a simple, compact construction; achieves a stable damping action even when temperature rises; and enables a good, smooth circular movement.

SUMMARY OF THE INVENTION

To achieve this object, a flexible support device according to a first aspect of the present invention is disposed between a first member having a flat supported part, and a second member having a columnar supported part substantially orthogonal to the flat supported part of the first member, and being relatively displaceable to the first member in an axial direction of the columnar supported part. The flexible support device has first and second hollow flexible support parts disposed substantially coaxially and flexibly displaceable at least in the direction of this axis respectively; a first fitting part formed integrally between the first and second flexible support parts for fitting to the flat supported part of the first member; a second fitting part formed integrally to a terminal side of either flexible support part for mounting on the columnar supported part of the second member; and a movement limiting part formed integrally to one flexible support part and/or second fitting part for limiting a movement of the second fitting part. The columnar supported part passes through the hollow interior of the first and second flexible support parts. The second fitting part is mounted covering the end of the columnar supported part of the second member. When the second fitting part is so mounted, the movement limiting part engages the end of the columnar supported part, and limits movement of the second fitting part in the direction of said end.

Once the flexible support device is installed, the movement limiting part prevents the flexible support device from coming off the end of the stud or shaft on which it is mounted, and also bears an applied load. It is therefore not necessary to provide a separate end plate fastened to the end of the columnar supported part for these purposes.

When seen in vertical section, the end of this columnar supported part of the second member preferably has a partially circular profile, and the inside edge of the second fitting part also has a partially circular profile. This enables the first and second members to move relative to each other on a circular path.

Yet further preferably, a plurality of protrusions is formed on the inside surface of the second fitting part with the protrusions directed to the center of this circular profile.

These protrusions maintain a specific gap between the end and the inside surface of the second fitting part, and enable an even smoother circular motion between the first and second members.

Yet further preferably, the second member is a drive base used as a drive chassis of an optical disk drive; and the first member is a component base supported to move linearly or circularly vertically to and separately from the drive base.

In an optical disk drive of this type, the flexible support device of the invention supports the component base floating on the device base, and protects it from vibration and impact to the drive base.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments of the present invention are described below with reference to the accompanying figures, starting first by describing the configuration of an optical disk drive into which a flexible support device according to the present invention is incorporated.

Figure 1:
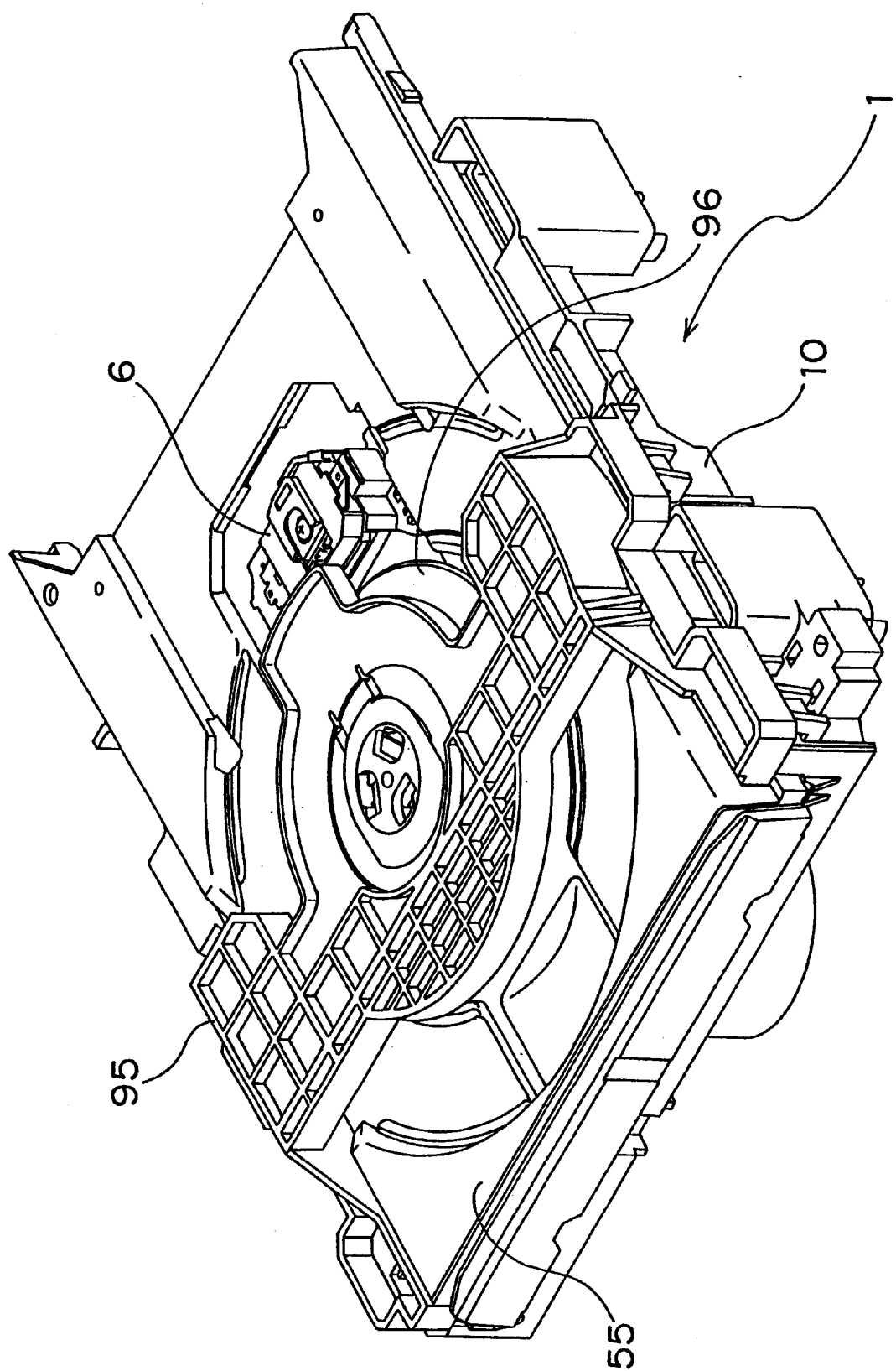
FIG. 1 is an overall perspective view of an assembled optical disk drive comprising a flexible support device (floating bushing) according to a preferred embodiment of the present invention.
Figure 2:
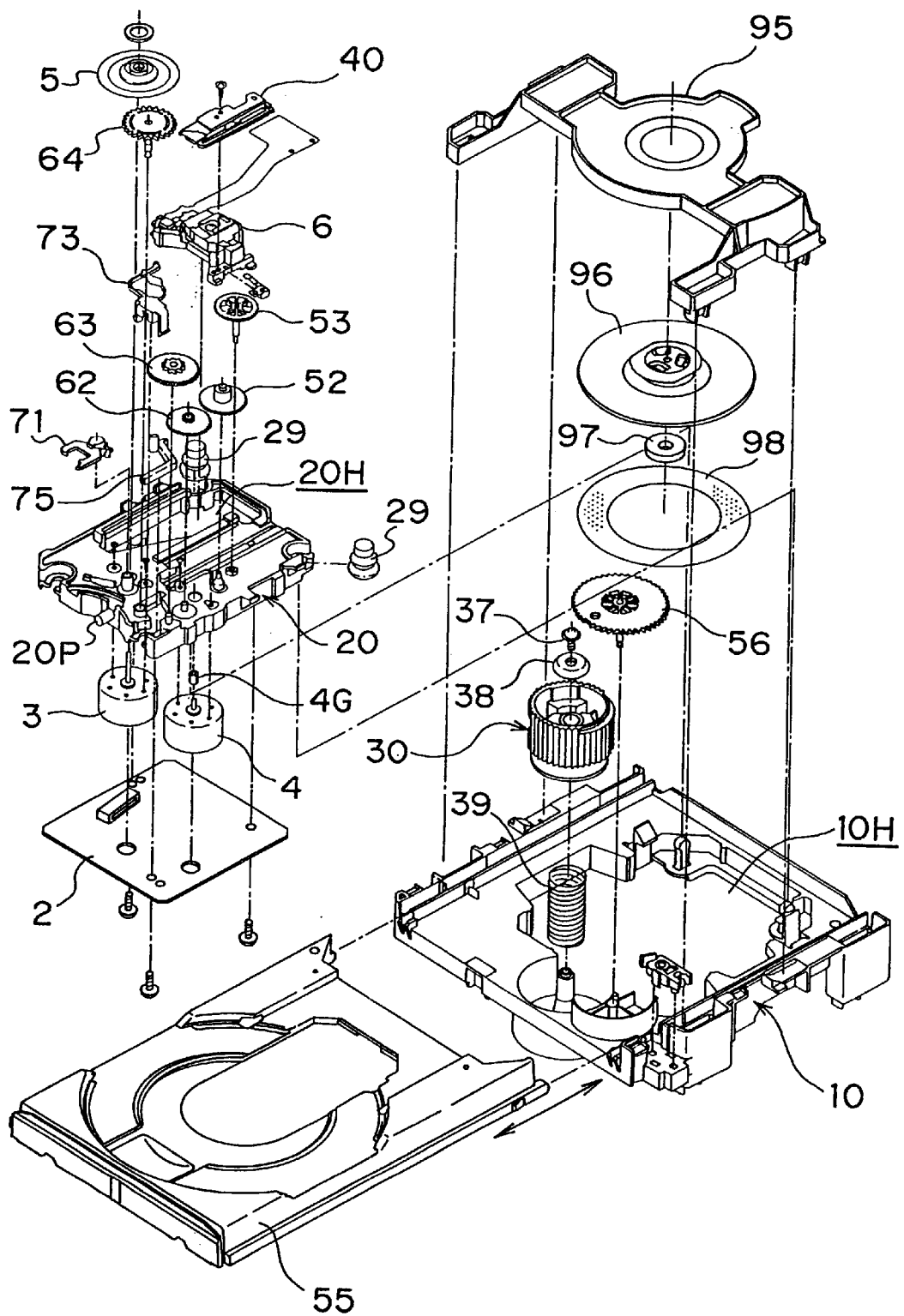
FIG. 2 is an exploded view of the disk drive shown in FIG. 1.
Figure 3:
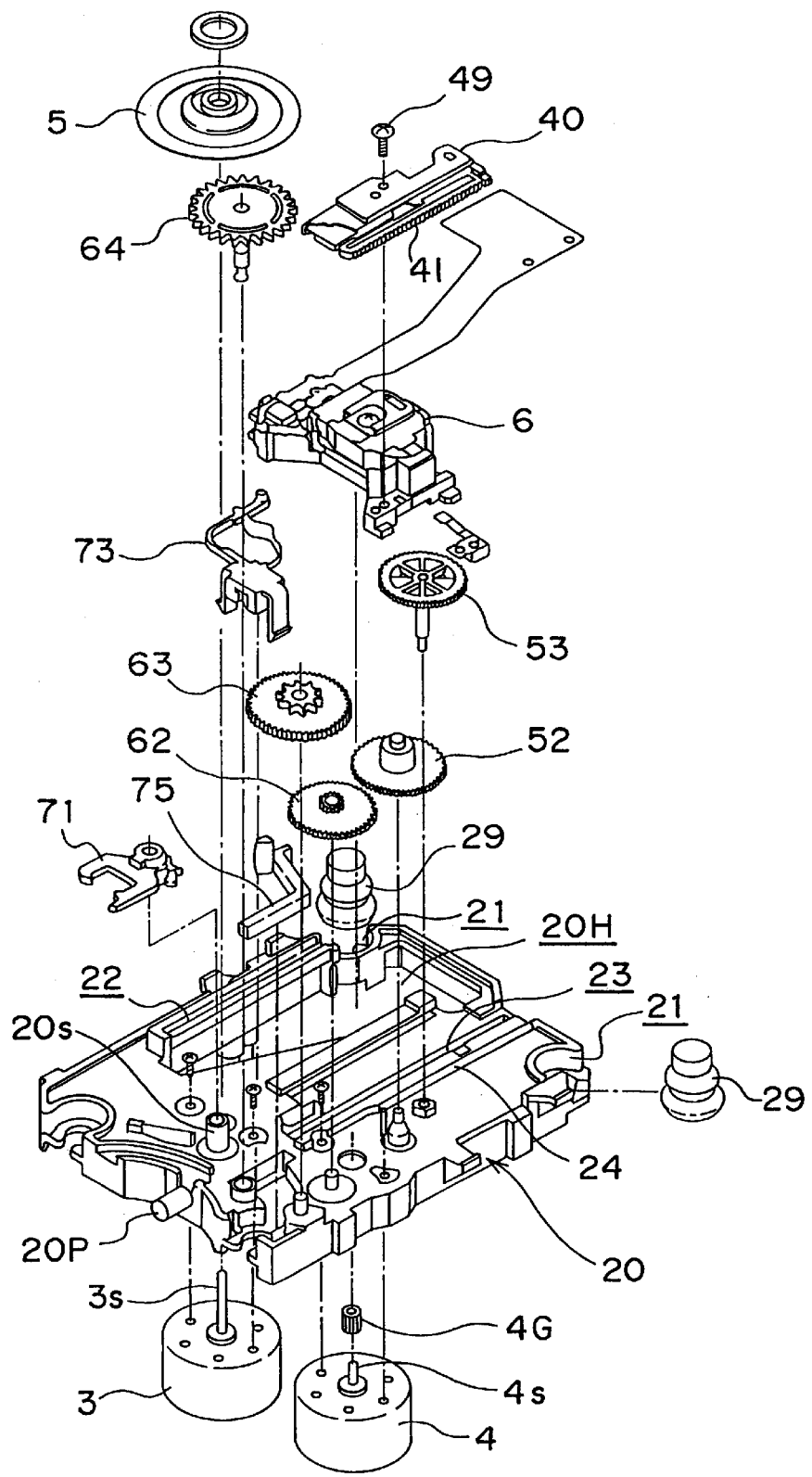
FIGS. 3 and 4 are enlarged views of parts of FIG. 2.
Figure 4:
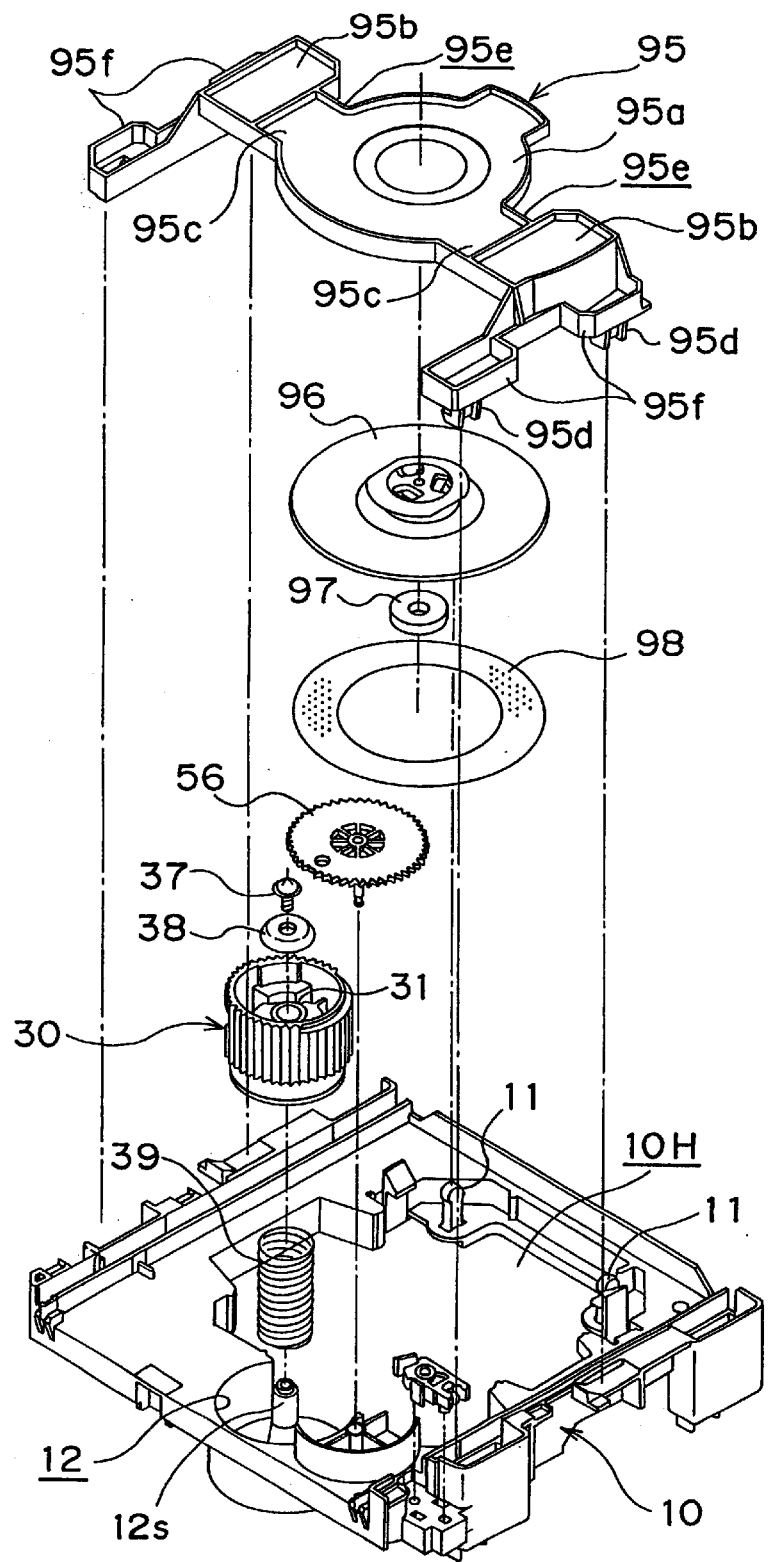

FIG. 1 is an overall perspective view of an optical disk drive (hereinafter it is appropriately referred to as a disk drive or simply a drive) into which a flexible support device according to a preferred embodiment of the present invention is incorporated. FIG. 2 is an exploded view of the disk drive shown in FIG. 1, and FIGS. 3 and 4 are enlarged views of parts of exploded view shown in FIG. 2.

Figure 5:
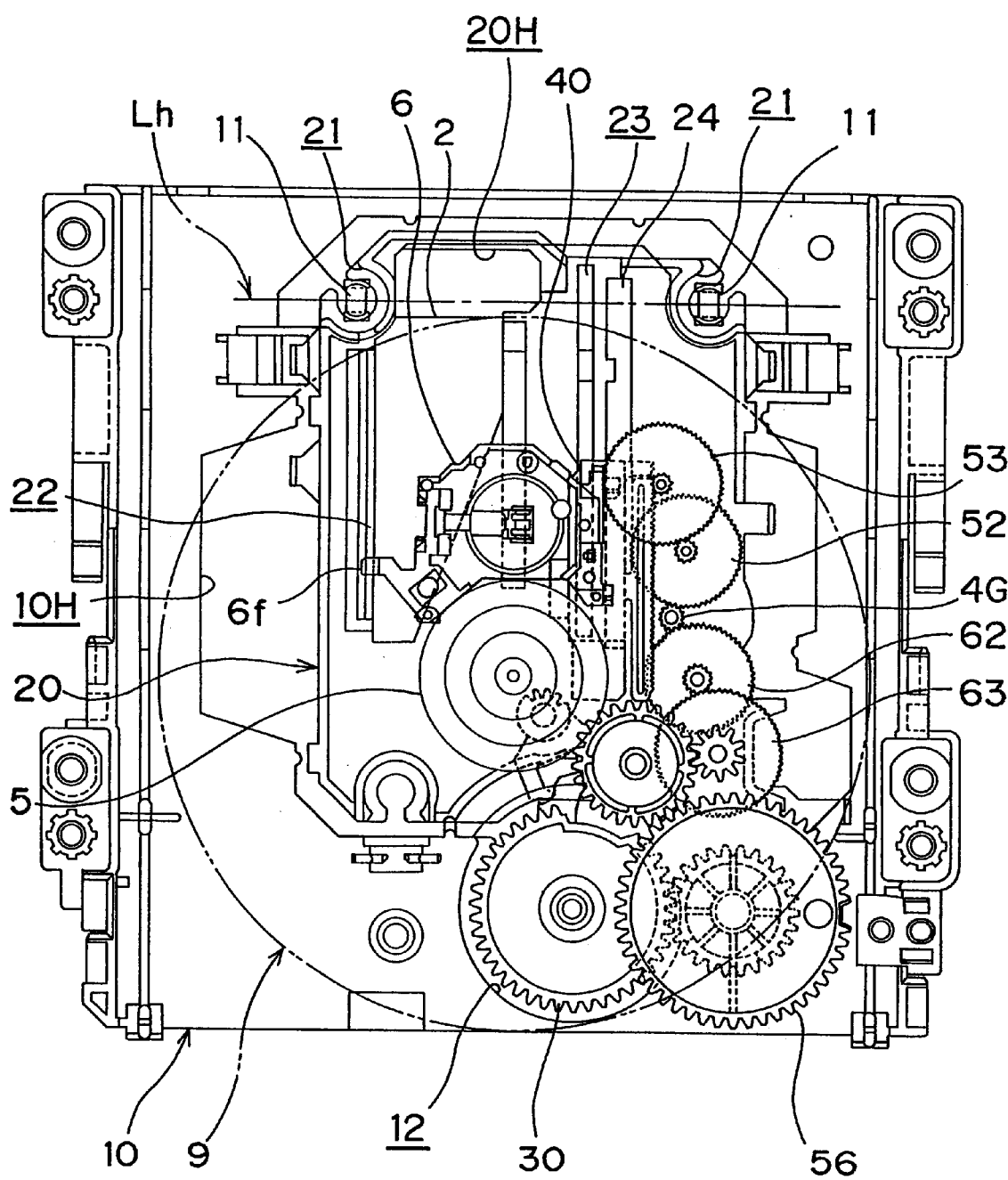
FIG. 5 is a plan view of an assembled traverse base and drive base of the optical disk drive.

As will be known from these figures, an optical disk drive 1 according to this embodiment of the invention comprises a drive base 10 as the installation base for major components of the drive 1, and a traverse base 20 as the support base for supporting the major part of the disk drive's drive mechanism. The overall shape of the drive base 10 is a substantially square frame when seen in plan view. The traverse base 20 is assembled to an internal space 10H in the drive base 10 as shown in FIG. 5.

A disc used as the data storage medium, such as a Compact Disc (CD), is placed in this disk drive 1 on a tray 55, which moves bidirectionally along the frame of drive base 10. The path of the tray 55 is diagonal as seen in FIG. 1 and FIG. 2 and indicated by the arrow in FIG. 2. Thus, when a disk is removed from inside the disk drive 1, that is, is ejected, the tray 55 travels diagonally downward to the left as seen in FIG. 1 and FIG. 2, and when the disk is loaded from outside into the disk drive 1, that is, is inserted, the tray 55 travels diagonally upward to the right as seen in FIG. 1 and FIG. 2.

It should be noted that the side of the disk drive 1 from which the disk, that is, the tray 55, is removed from inside the disk drive 1 (the diagonal lower left side in FIGS. 1 and 2) is defined herein as the front of the drive 1, and the side of the drive 1 to which the disk is inserted (the diagonal upper right side in FIGS. 1 and 2) is defined herein as the back of the drive 1. The top and bottom of the drive 1 as seen in FIGS. 1 and 2 are also defined as the top and bottom sides.

A pair of right and left traverse base support studs 11 is disposed vertically at the back of the drive base 10, that is, at the top right in FIG. 1 and FIG. 2. A notch 21 is formed at each back corner of the traverse base 20. A flexible, typically rubber, bushing 29 (floating bushing) is fit into each notch 21.

By fitting these bushings 29 on the above-noted traverse base support studs 11, the back of the traverse base 20 is supported such that it can move circularly vertically to the drive base 10 around a horizontal line Lh (see FIG. 5) between the centers of the tips of the right and left traverse base support studs 11.

The back of the traverse base 20 is also supported by means of the right and left bushings 29 so that the traverse base 20 can float on the drive base 10 within a specific range of movement. This range of movement is that enabled by the flexibility of the bushings 29. It should be noted that the right and left bushings 29 are not shown in FIG. 5 so that the traverse base support studs 11 and notches 21 can be clearly seen.

It should be noted that the above-noted drive base 10 is equivalent to the second member and device base of the accompanying claims, and the traverse base 20 is equivalent to the first member and component mounting base of the accompanying claims. Furthermore, floating bushing 29 is equivalent to the flexible support device of the accompanying claims.

Figure 8:
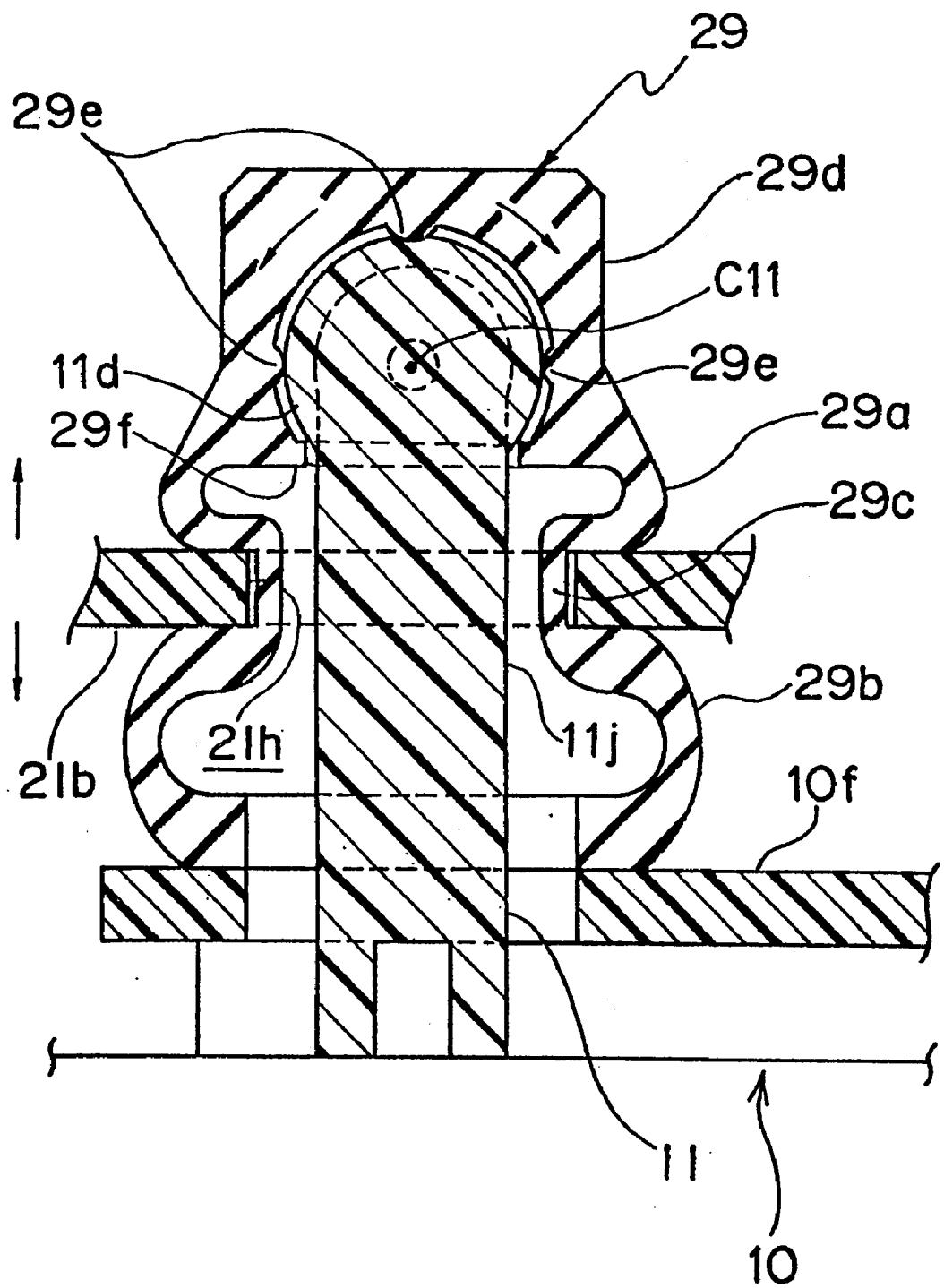
FIG. 8 is an enlarged vertical section view of a flexible support device (floating bushing) fit to the traverse base.

Bushings 29 are described in detail next with reference to FIG. 8. The bushings 29 are a single-body hollow body molding with one end closed and the other end open. Each bushing 29 has relatively large diameter first and second damping parts 29a and 29b in sequence along the long axis of the bushing 29, and a relatively small diameter fitting part 29c (first fitting part) between the two damping parts.

This first fitting part 29c thus forms a constricted neck between damping parts 29a and 29b, and is the part that is fit to the traverse base 20 as the first member to be supported in a floating state by the floating bushings 29. More specifically, a bushing mounting flange 21b of a specific thickness is disposed to notch 21 at the back corner of the traverse base 20. A hole 21h is provided in this bushing mounting flange 21b. The floating bushing 29 is installed to a notch 21 in a rear corner of the traverse base 20 by fitting the outside of the first fitting part 29c in the hole 21h of the bushing mounting flange 21b.

A second fitting part 29d for closing the cavity inside the floating bushing 29 is integrally formed to the terminal side of the first damping part 29a. This second fitting part 29d is the part that is fit to the drive base 10, which is the said second member to be floatably supported by the bushings 29. More specifically, traverse base support stud 11 is inserted through the hollow center of first and second damping parts 29a and 29b until this second fitting part 29d is fit to the end 11d of the traverse base support stud 11.

When the traverse base 20 is assembled to the drive base 10, traverse base support stud 11 of drive base 10 is substantially orthogonal to the bushing mounting flange 21b of traverse base 20, and traverse base 20 is flexibly displaceable to the drive base 10 in at least the axial direction of the traverse base support stud 11, but is more preferably also flexibly displaceable in a direction orthogonal to said axial direction.

The shape of the outside edge of end 11d of traverse base support stud 11 is part of a circle, the diameter of which is greater than the width of shaft part 11j, when seen in vertical section. The shape of the inside edge of the second fitting part 29d of the floating bushing 29 as seen in vertical section is also part of a circle.

A movement limiting part 29f is further disposed at the bottom part of the second fitting part 29d, or the top part of first damping part 29a, or between second fitting part 29d and first damping part 29a. As shown in FIG. 8, this movement limiting part 29f is disposed where first damping part 29a and second fitting part 29d join in this exemplary embodiment. This movement limiting part 29f engages end 11d of traverse base support stud 11, and more specifically engages the base of end 11d, to limit the movement of second fitting part 29d in the direction of the end of traverse base support stud 11.

This movement limiting part 29f is preferably formed as an inward protrusion of the inside circumference part of the part where second fitting part 29d and first damping part 29a join. The inside diameter of this movement limiting part 29f is greater than the width dimension of the traverse base support stud 11 and smaller than the outside dimension of the end 11d.

The terminal side of the second damping part 29b is open. The traverse base support stud 11 is inserted to the floating bushing 29 from this opening. The terminal part of the second damping part 29b contacts the bushing support surface 10f of the drive base 10.

Preferably, the back of the traverse base 20 is assembled to the drive base 10 by way of bushings 29 such that the terminal part of the second damping part 29b contacts bushing support surface 10f with a certain flexibility when in a normal state. As used herein this normal state is that in which only the normal weight of the traverse base 20 and components mounted thereon bears on the bushings 29.

It should be noted that the bushing mounting flange 21b of traverse base 20, the traverse base support stud 11 of drive base 10, and the end 11d of said traverse base support stud 11 correspond to the flat supported part, the columnar supported part, and the end part, respectively, described in the accompanying claims.

In addition, the above-noted first and second damping parts 29a and 29b, first and second fitting parts 29c and 29d, and movement limiting part 29f correspond to the first and second flexible support parts, the first and second fitting parts, and the movement limiting part, respectively, described in the accompanying claims.

When the disk drive 1 is subject to sufficient vibration or impact during production or use of the disk drive 1, the vibration force or impact load causes relative displacement of the drive base 10 and traverse base 20. If this force or load acts in the direction causing first damping part 29a to compress (that is, in a direction in which the back of the traverse base 20 is upwardly displaced and the bushing mounting flange 21b moves in the direction approaching the end 11d of traverse base support stud 11), the load is carried on end 11d of traverse base support stud 11 by way of movement limiting part 29f. This is because the movement limiting part 29f of floating bushing 29 is engaged with the base of end 11d of traverse base support stud 11.

When the back of traverse base 20 is greatly displaced upwardly and the bushing mounting flange 21b of traverse base 20 is greatly displaced in the direction moving toward the end of traverse base support stud 11, engagement of the movement limiting part 29f with the base of end 11d of traverse base support stud 11 also limits movement of the second fitting part 29d toward said end, and thus prevents the floating bushing 29 from slipping off traverse base support stud 11.

Figure 44:
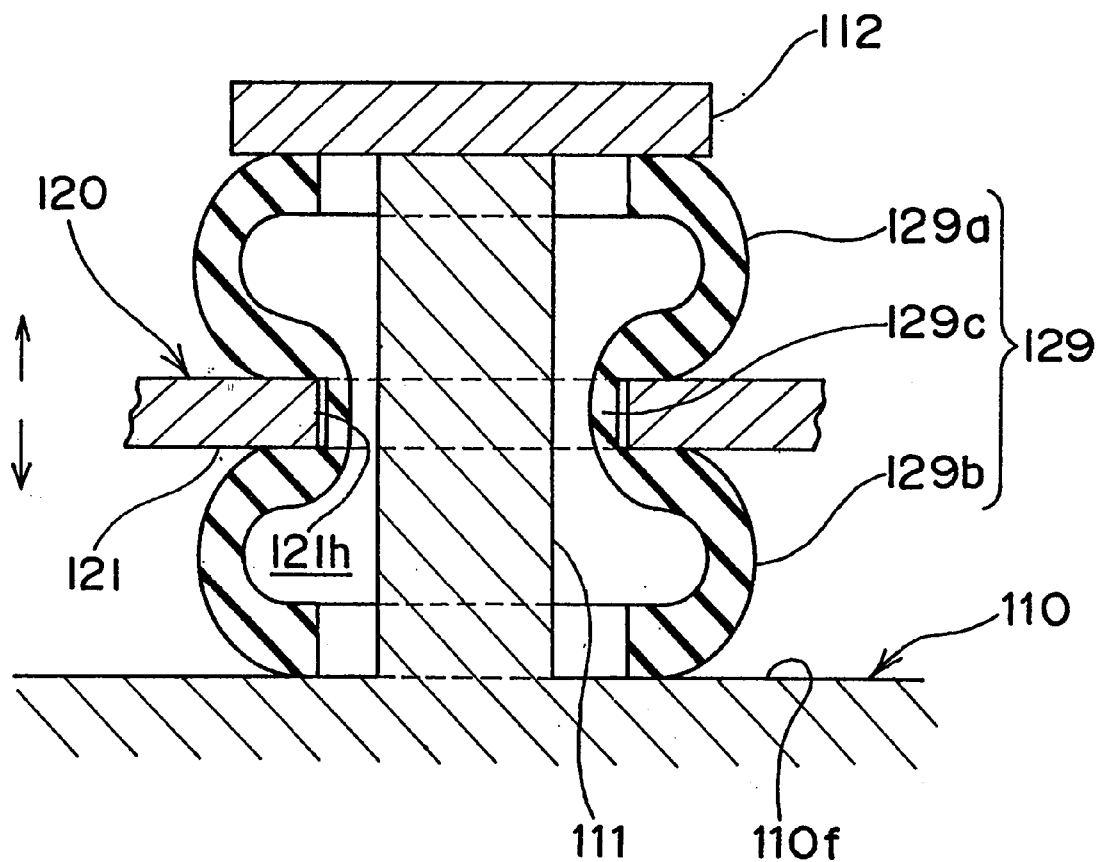
FIG. 44 is a vertical enlarged section view of a flexible support device according to a prior art.

It is therefore not necessary to separately provide an end plate 112 (see FIG. 44) as a load bearing plate and to prevent flexible support device removal as it is with the above-noted related art.

That is, after installing the floating bushing 29 between traverse base 20 and drive base 10, it is not necessary to fasten a separate end plate 112 to the end of traverse base support stud 11. Assembling this floating bushing 29, that is, the flexible support device of the invention, into another product is therefore simple compared with the related art. The number of parts and the number of assembly steps can also be reduced. A floating bushing 29, that is, the flexible support device of the invention, is therefore advantageous as a means of holding down production cost.

One side of the floating bushing 29 (that is, the side to which the second fitting part 29d is formed) is free and unrestrained because the second fitting part 29d is mounted so as to cover end 11d of traverse base support stud 11.

Compared with a conventional flexible support device disposed between end plate 112 and the base surface 110f of second member 110 such that the overall length (height) thereof in the axial direction is limited by the end plate 112 and second member 110, it is therefore possible to reduce the length change in the axial direction as a result of differences in the thermal expansion coefficients of the floating bushing 29 (i.e., the flexible support device) and other parts (such as the resin bushing mounting flange 21b and traverse base support stud 11) when the temperature rises. A stable damping characteristic can thus be achieved even when the temperature rises.

When a load is applied in a direction compressing the first damping part 29a, at the terminal end of which is the second fitting part 29d, (that is, loads causing upward displacement of the back of traverse base 20, causing bushing mounting flange 21b to approach the end 11d of traverse base support stud 11), vibration components and impact loads in the same direction can be effectively absorbed by the damping effect accompanying the compressive deformation of the first damping part 29a within the elasticity limits of the first damping part 29a. In other words, only a damping action accompanying compressive deformation within the elasticity limits of the first damping part 29a is achieved in this case.

When a load is applied in a direction compressing the second damping part 29b at the terminal side of which the second fitting part 29d is not formed (that is, in the direction in which the back of traverse base 20 is downwardly displaced, and bushing mounting flange 21b is distanced from the end 11d of traverse base support stud 11), the top of the second fitting part 29d becomes suspended on the end 11d of traverse base support stud 11, and the first damping part 29a is strained within its elasticity limit.

Vibration and impact forces can therefore be absorbed both by the damping effect of the strain of the first damping part 29a and the damping effect of the compressive deformation of second damping part 29b. Extremely effective vibration absorption can thus be achieved in corresponding same directions.

It should be noted that as part of the typically rubber floating bushing 29, second fitting part 29d is particularly flexible. It is therefore further possible for this flexibility of the second fitting part 29d to be used to increase vibration absorption and noise suppression when vibration forces causing relative movement of the drive base 10 and traverse base 20 are applied.

It should be further noted that the second fitting part 29d of the floating bushing 29 can be formed without completely closing one end (the top) of the internal cavity of the floating bushing 29. More specifically, the second fitting part 29d can have an opening insofar as the end 11d of the traverse base support stud 11 does not pass completely through said opening when a force lifting the traverse base support stud 11 toward the opening is applied.

As described above, a greater load can be absorbed in the direction in which the second damping part 29b is compressed than the direction in which the first damping part 29a is compressed. As described in further detail below, traverse base 20 must be moved circularly downward from the normal position around the back of the traverse base 20 whenever a disk is loaded to or unloaded from this disk drive 1. The lower second damping part 29b is therefore compressed somewhat more frequently than the first damping part 29a, and the load applied thereto is also greater.

Therefore, when floating bushing 29 is used in an application in which a great load is expected to act in one direction of the floating bushing 29, such as when it is used as a flexible support device between a traverse base 20 and drive base 10 in this optical disk drive 1, floating bushing 29 can be used to achieve a simple, compact construction by installing the floating bushing 29 so that the load is applied in the direction compressing second damping part 29b, that is, the damping part to which second fitting part 29d is not disposed.

As a result, compared with a conventional configuration in which flexible support parts 129a and 129b perform independent damping actions depending upon the direction of an applied force (see FIG. 44), applied forces and loads, even when a particularly high load is expected in one direction, can be easily handled without incurring an increase in flexible support device size or an increase in structural complexity.

It should be noted that contact between the terminal end of the second damping part 29b and the bushing support surface 10f in this normal state is not necessarily a prerequisite for achieving this vibration damping effect from the second damping part 29b. A gap between this terminal end and the bushing support surface 10f simply reduces the vibration damping effect an amount equivalent to the gap, and when the relative movement between the drive base 10 and traverse base 20 exceeds this gap, the vibration damping effect is equivalent to how much this relative movement exceeds the gap.

Lateral vibration components parallel to the base surface, such as vibration components in the front-back direction or side to side direction of the traverse base 20, are absorbed by lateral deformation of the floating bushing 29 within its elasticity limit As described above, the shape of the outside edge of end 11d of traverse base support stud 11 is part of a circle when seen in vertical section, and the shape of the inside edge of the second fitting part 29d of the floating bushing 29, which is fit to end 11d, is also part of a circle as seen in vertical section.

When thus comprised, the second fitting part 29d, that is, the entire floating bushing 29, can move circularly around center C11 of the traverse base support stud end 11d. The axis of circular movement Lh (see FIG. 5) when the traverse base 20 pivots up or down relative to the drive base 10 is a straight line joining centers C11 of the ends 11d of the right and left traverse base support studs 11.

Yet further preferably, there is a specific gap between the inside circumference of the second fitting part 29d and the outside circumference of the end 11d of traverse base support stud 11, and a plurality of protrusions 29e are formed in the second fitting part 29d. These protrusions 29e are directed toward the center of the inside circumference of second fitting part 29d, and therefore to the center C11 of support stud end 11d when the traverse base support stud 11 is fit into the floating bushing 29.

That is, second fitting part 29d of floating bushing 29 is fit onto the end 11d of traverse base support stud 11 through intervening protrusions 29e, and a specific gap is thus maintained between the second fitting part 29d and end 11d. As a result, the second fitting part 29d can move extremely smoothly circularly to the end 11d of traverse base support stud 11.

The floating bushing 29 thus comprises first and second damping parts 29a and 29b, first and second fitting parts 29c and 29d, and movement limiting part 29f. It is therefore possible to provide a simple, space-saving, low cost floating means (flexible support device) that can support the entire weight of the traverse base 20, prevent the traverse base 20 from slipping vertically out of place, and effectively absorb vibration components and impact loads.

Furthermore, by providing a part that determines the center of rotation, an accurate center of circular movement can be assured without providing another center for circular movement.

As will also be known from FIG. 4 and FIG. 5, a recess 12 of which the shape of the perimeter is part of a circle is formed at the front edge part of internal space 10H in drive base 10. A spindle 12s is vertically disposed in the bottom center of this recess 12. The center boss 31 of a substantially cylindrical cam gear 30 is fit freely rotatably on this spindle 12s. A coil spring 39 (floating spring) is disposed between the bottom of this cam gear 30 and the bottom of recess 12 in drive base 10. The center boss 31 of the cam gear 30 is passed over the spindle 12s, and a set screw 37 is screwed through a typically rubber flexible collar 38 (floating collar) into the end of the spindle 12s.

The cam gear 30 is therefore housed in recess 12 of drive base 10 with the top and bottom held between flexible members 38 and 39, that is, with the bottom of the cam gear 30 supported by coil spring 39 and the top held by the floating collar 38. As a result, the cam gear 30 is supported on the drive base 10 in a manner enabling the cam gear 30 to float (in a floating state) within specific limits, that is, within the limits of the floating collar 38 and floating spring 39 elasticity.

It should be noted that the floating bushing 29 and floating collar 38 shall not be limited to rubber materials. For example, a soft resin or other suitable material with the desired flexibility can be alternatively used.

The cam gear 30 is described in detail next with reference to FIGS. 24 to 29. The cam gear 30 comprises on its outside surface a plurality of vertically oriented teeth 30g (external teeth), that is, parallel to the long axis Lg of the cam gear 30, and a cam channel 33 having top and bottom horizontal channels 33a and 33c, and diagonal channel 33b.

There is also a smooth part 34 in which there are no teeth 30g on the outside surface of the cam gear 30. A protrusion 20P for slideably engaging the cam channel 33 is also provided at the front edge of the traverse base 20 (see FIG. 2 and FIG. 3). This protrusion 20P engages the cam channel 33 to support the front of the traverse base 20 on the drive base 10 by way of cam gear 30.

Figure 6:
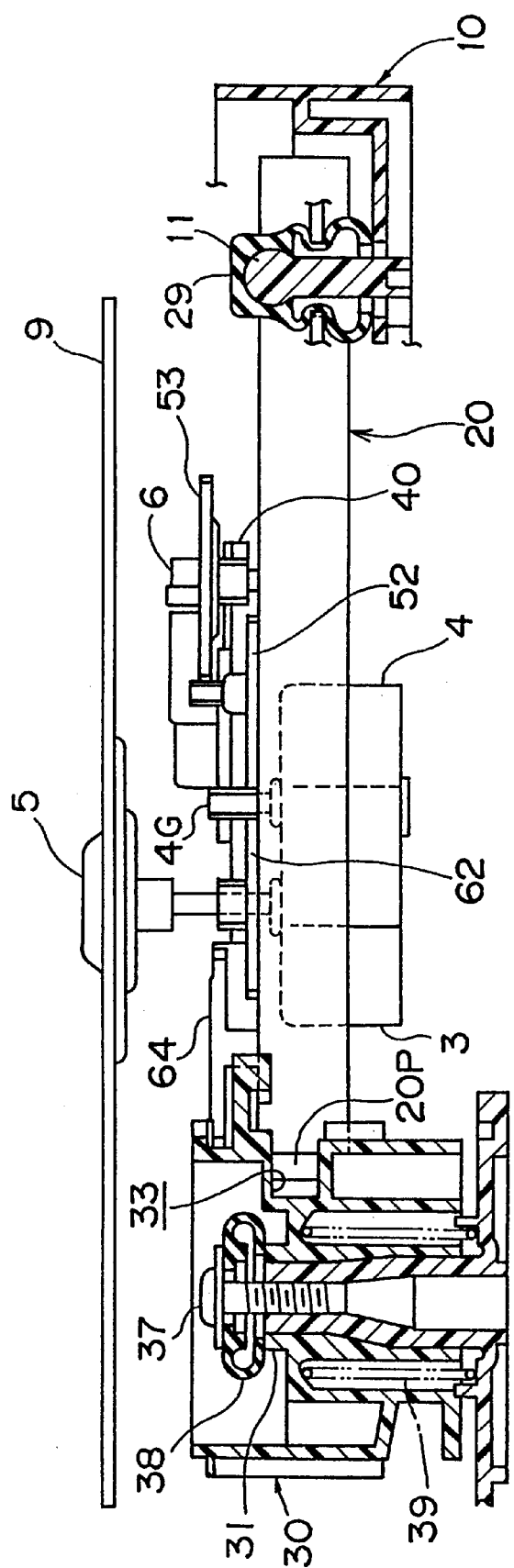
FIG. 6 is a partially sectional side view showing generally a support structure holding the traverse base to the drive base.
Figure 7:
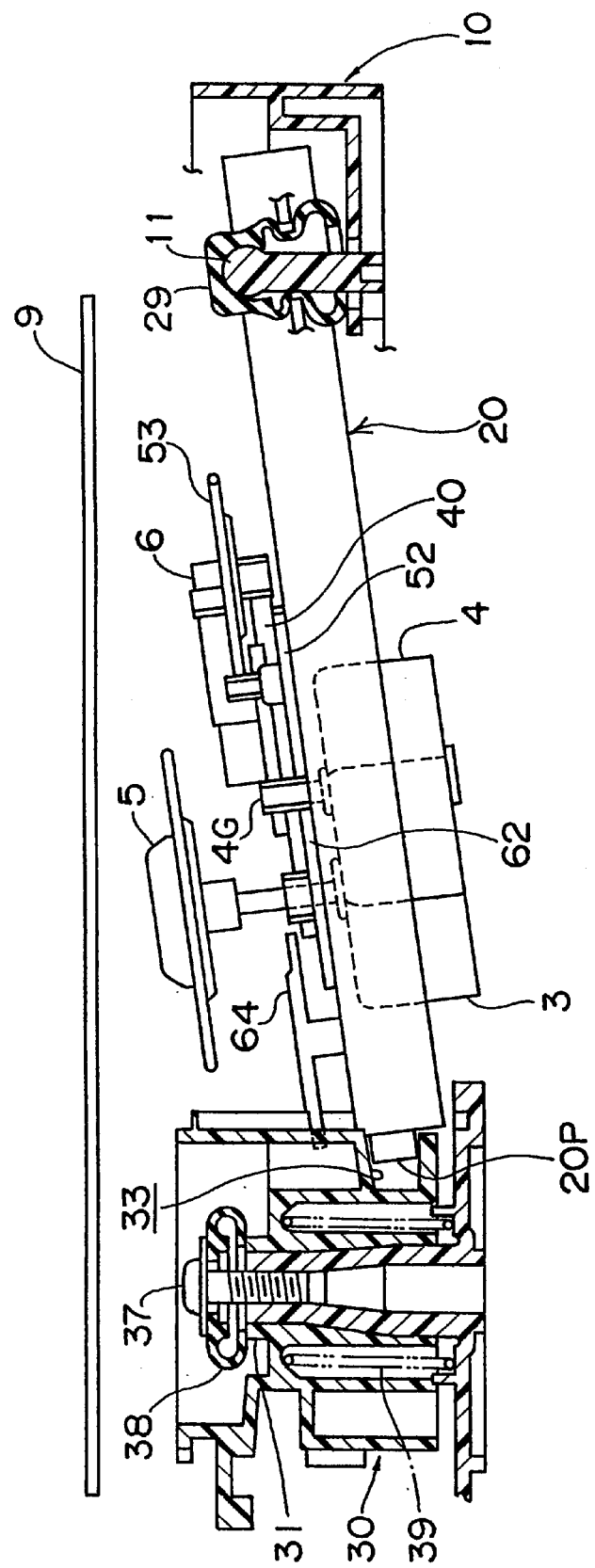
FIG. 7 is a partially sectional side view showing generally the traverse base inclined to the drive base.

As shown in FIG. 6 and FIG. 7, the traverse base 20 is thus supported at the back by way of bushings 29 and at the front by way of cam gear 30 supported on floating collar 38 and floating spring 39 so that the traverse base 20 floats within specific limits on the drive base 10. Note that these limits are determined by the flexibility of the floating bushing 29, floating collar 38, and floating spring 39.

The traverse base 20 is thus not rigidly supported on the drive base 10 in the manner of the related art, but is supported so that it can float on the drive base 10 within the range of the flexibility of the supporting damping members, that is, the floating bushing 29, floating collar 38, and floating spring 39. The damping members 29, 38, and 39 can therefore absorb an impact, shock, or vibration applied to the disk drive 1, thereby preventing the force of the impact or vibration from being directly transmitted from the drive base 10 to components on the traverse base 20. As a result, a disk drive 1 with improved durability and resistance to impact and vibration can be achieved.

Furthermore, by supporting the traverse base 20 so that it floats on the drive base 10 within the range of the flexibility of the damping members 29, 38, and 39, it is possible to adjust the relative positions of components on the drive base 10 and traverse base 20 within the floating range of the traverse base 20. Compared with a conventional disk drive in which the components are rigidly supported, it is therefore possible to require less precision in parts manufacture and assembly, and productivity can therefore be improved in the manufacturing process.

As shown in FIG. 2 and FIG. 3, first and second electric motors 3 and 4, and a circuit board 2 comprising a control circuit for controlling driving motors 3 and 4, are also fastened to the bottom of traverse base 20.

A turntable 5 on the top of which is placed a disc 9 (see FIGS. 5 to 7) is also disposed above the traverse base 20. This turntable 5 is linked to the output shaft 3s (see FIG. 3) of the first motor 3 (spindle motor). An optical pickup 6 for writing a data signal to or reading a recorded data signal from the disc 9, and other drive components for operating the disk drive 1, are also disposed on top of traverse base 20.

These drive mechanisms are described next below.

As will be understood from FIG. 3 and FIG. 5, a front to back (top to bottom as seen in FIG. 5) opening 20H is provided in traverse base 20. A pair of pickup guide channels 22 and 23 for guiding front to back travel of the optical pickup 6 is provided on the sides of this opening 20H. The turntable 5 is preferably positioned near the front end of the pickup guide channels 22 and 23 and opening 20H, or even forward of this position.

The optical pickup 6 is movably supported front to back on the traverse base 20 by slideably engaging right and left legs 6f in the pickup guide channels 22 and 23. It should be noted that a flexible connection means, such as a flexible ribbon cable, for electrically connecting the optical pickup 6 and circuit board 2 is passed through the opening 20H.

A rail member 24 (guide rail) extending parallel to the guide channel is provided beside one of the pickup guide channels 22 and 23, and a rack member 40 (feed rack) enabling the pickup to slide lengthwise to the guide rail 24 is engaged with the guide rail 24. Note that in FIG. 3 and FIG. 5 the guide rail 24 is provided on the right beside guide channel 23.

One end (the right end in FIG. 3 and FIG. 5) of the optical pickup 6 is linked to the feed rack 40 by a screw 49 (see FIG. 3). As a result, the optical pickup 6 can be moved bidirectionally front and back guided by the pickup guide channels 22 and 23 by sliding the feed rack 40 along the guide rail 24.

As shown in detail in FIGS. 30 to 34, teeth 41 (driven rack part) are formed along substantially the full length on one side of the feed rack 40 (the right side in FIG. 3 and FIG. 5). A length of teeth 42 (transfer path switching rack) is also formed on the other side at the front of the feed rack 40. (See FIG. 30.)

It should be noted that arm 40f projecting from the back of the feed rack 40 engages the pickup guide channel 23, and limits movement of the feed rack 40 to the back by striking and stopping at the back wall of the pickup guide channel 23 when the feed rack 40 travels to the back (upward in FIG. 5).

A gear set 51 (rack drive gear set) comprising a group of gears is disposed to the traverse base 20 to drive the feed rack 40 and move the optical pickup 6 bidirectionally front and back.

As shown in detail in FIGS. 9 to 13, this gear set 51 comprises: a motor gear 4G fastened to the output shaft 4s of the second motor 4; a first traverse gear 52 having a large diameter input gear 52A (first traverse input gear) for engaging the motor gear 4G, and a small diameter output gear 52B (first traverse output gear) integrally disposed to the top of the input gear 52A; and a second traverse gear 53 having a large diameter input gear 53a (second traverse input gear) for engaging the first traverse output gear 52B, and a small diameter output gear 53B (second traverse output gear) integrally disposed to the bottom of the second traverse input gear 53a. The second traverse output gear 53B engages the driven rack part 41 of the feed rack 40.

When the second motor 4 is driven and the motor gear 4G turns at a specific speed in, for example, the counterclockwise direction as seen in FIG. 9 to FIG. 13, motor rotation is speed reduced at a specific reduction ratio and is transferred to the output side by the gear set 51 so that the final output gear 53B (second traverse output gear) turns counterclockwise at a reduced speed.

This causes the feed rack 40 to travel at a predetermined speed along the guide rail 24 to the front (to the bottom as seen in FIGS. 9 to 13). When the second motor 4 is driven in the direction opposite that described above, and feed rack 40 also travels in the opposite direction.

It is therefore possible by switching the forward and reverse direction of second motor 4 operation to change the direction in which the feed rack 40, and therefore the optical pickup 6, travels, and the feed rack 40 and optical pickup 6 can therefore be driven bidirectionally forward and back.

The feed rack 40 and gear set 51 form the basic optical pickup drive mechanism, equivalent to the optical pickup drive mechanism of the accompanying claims, whereby the optical pickup 6 is moved in two directions between the inside and outside circumference areas of the disc 9. The pickup guide channels 22 and 23 and guide rail 24 also assist driving the optical pickup 6.

A tray drive gear 56 for moving the tray 55 between an unloading position at the front of the disk drive 1 so that a disc can be placed on or removed from the tray 55, and a loading position inside the disk drive 1 at which a disk is loaded to or unloaded from the turntable 5, is provided at the front of the drive base 10.

It should be noted that the loading position and unloading position are also appropriately referred to as the first position and second position, respectively, below.

This tray drive gear 56 comprises a large diameter output gear 56B for engaging the tray rack teeth 55g provided on the back of the tray 55 (see FIG. 19 to FIG. 21), and a small diameter input gear 56A below the output gear 56B. The tray drive gear 56 is positioned beside the cam gear 30 such that the input gear 56A engages the outside teeth 30g of the cam gear 30.

The tray 55, tray rack teeth 55g, and tray drive gear 56 constitute a disk loading mechanism for carrying a disc 9 bidirectionally between the turntable 5 loading position (first position) and the unloading position (second position) outside the disk drive 1.

A loading drive gear set 61 (see FIG. 9 to FIG. 13) for moving the tray 55 and transferring the disc 9 between a unloading position and a loading position is provided on top of the traverse base 20.

This loading drive gear set 61 comprises: motor gear 4G attached to the output shaft 4s of the second motor 4; a first loading gear 62 having a large diameter first loading input gear 62A for engaging the motor gear 4G, and a small diameter first loading output gear 62B disposed integrally to the top of the first loading input gear 62A; a second loading gear 63 having a large diameter second loading input gear 63A for engaging the first loading output gear 62B, and a small diameter second loading output gear 63B disposed integrally to the top of the second loading input gear 63A; and a large diameter third loading gear 64 for engaging the second loading output gear 63B. This third loading gear 64 engages teeth 30g of the cam gear 30.

Figure 29:
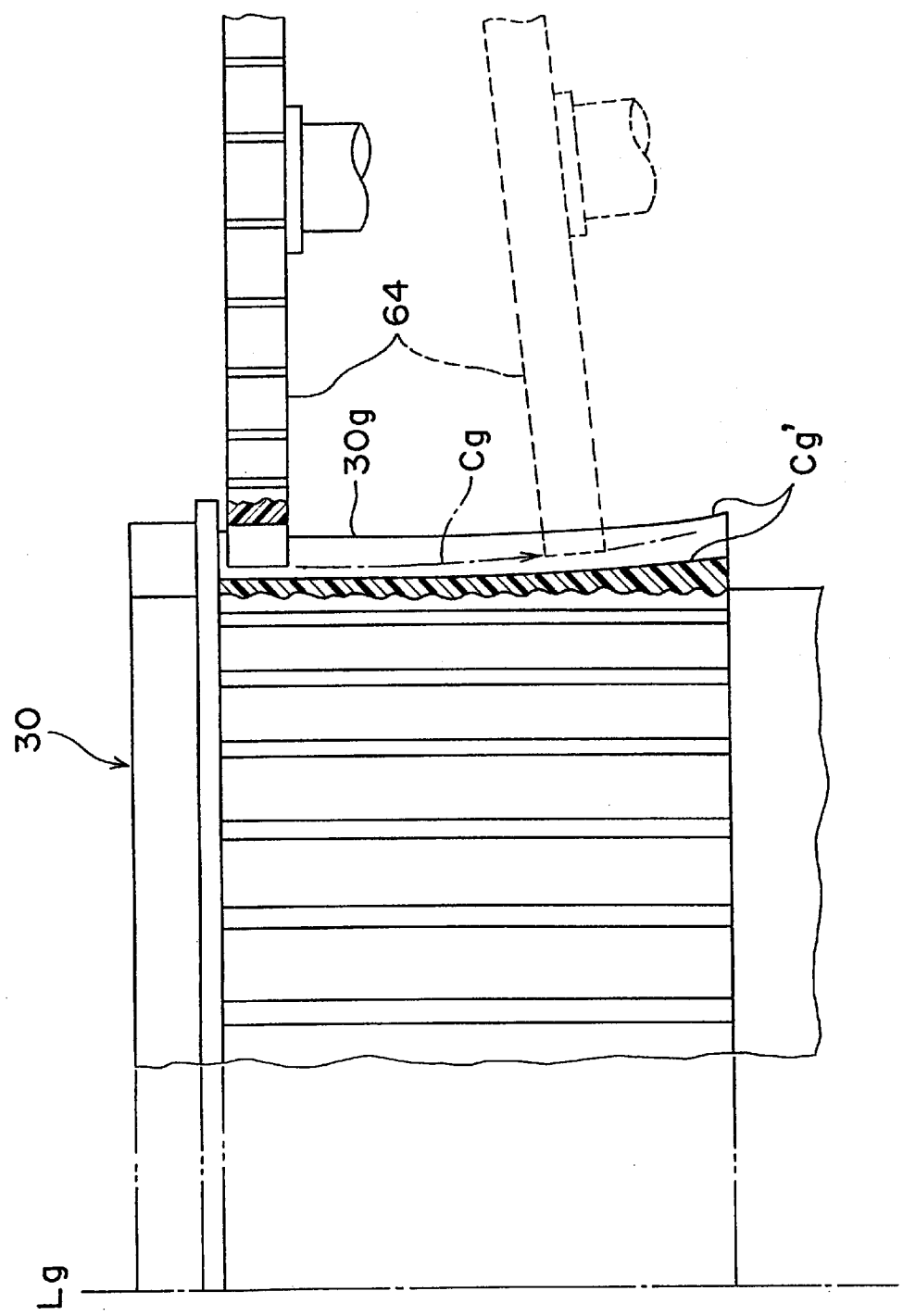
FIG. 29 is a partial vertical section view showing the tooth profile of the cam gear.

The profile of teeth 30g of the cam gear 30 when seen in vertical section is more preferably curved as shown in FIG. 29. When the traverse base 20 and cam gear 30 are assembled into the drive base 10 with the traverse base 20 pivoting at the back edge thereof so as to move circularly up and down relative to the drive base 10 (see FIG. 6 and FIG. 7), the curve of the tooth profile is part of the arc Cg' tracing the circular path Cg of the front edge of the third loading gear 64.

The third loading gear 64 on the traverse base 20 and teeth 30g of the cam gear 30 can therefore reliably and smoothly engage even when the traverse base 20 has swung to a position at an angle to the drive base 10 (indicated by the dotted line in FIG. 29 and shown in FIG. 7). It should be noted that the profile of teeth 30g in vertical section can be a straight line at an incline to the long axis Lg of the cam gear 30 and approaching curve Cg'.

It should be further noted that the second loading gear 63 is not shown in FIG. 6 and FIG. 7 to provide a clearer view of the third loading gear 64 engaging teeth 30g of cam gear 30.

As thus described, the profile in vertical section of the teeth 30g of cam gear 30 is an arc following the circular path of the third loading gear 64, that is, the last output gear of the loading drive gear set 61, as the gear 64 moves circularly up or down in conjunction with the circular movement of the traverse base 20, or is a straight line approaching this arc. As a result, the final output gear 64 reliably and smoothly engages teeth 30g of cam gear 30 even when the loading drive gear set 61 moves in a circular path vertically in conjunction with the movement of traverse base 20 in a circular path.

It should be noted that a loading drive mechanism for driving the disk loading mechanism comprises basically the loading drive gear set 61 and cam gear 30, or more specifically the teeth 30g thereof.

The above-noted optical pickup 6 can move to a specified position on the inside circumference side of the data signal recording area of the disc 9. When the optical pickup 6 is then moved by the drive power of second motor 4 via the gear set 51 from the outside circumference side of the disc 9 to the inside circumference side, and reaches said specified position outside of the data signal recording area of the disc 9, the transfer path of second motor 4 drive power is switched to the loading drive gear set 61.

This transfer path switching operation is described further in detail with reference to FIG. 14 to FIG. 18. A vertical stud 20s is disposed at the front of the traverse base 20. A trigger lever 71 for switching the power transfer path is rotatably supported on the stud 20s. A rocking lever 73 limiting the position of the trigger lever 71 is provided nearby.

Figure 35:
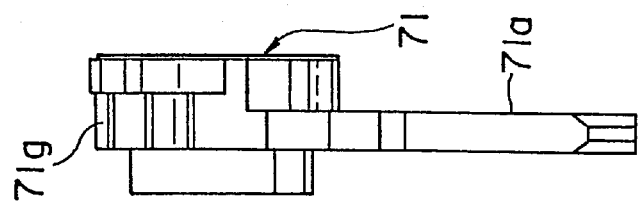
FIG. 35 is a side view of a trigger lever shown in a direction of arrows Y35—Y35 in FIG. 36.
Figure 36:
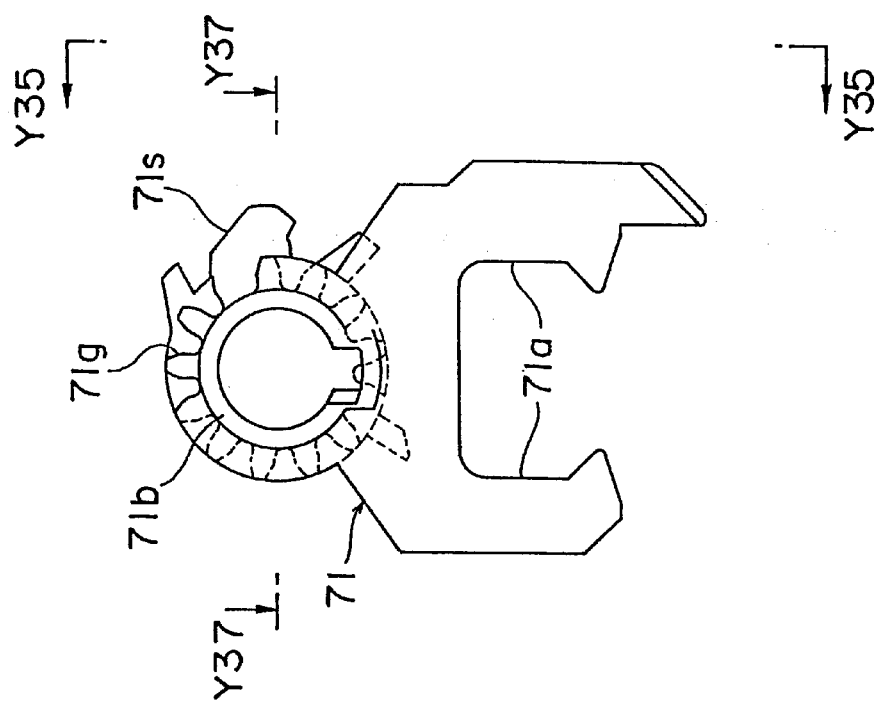
FIG. 36 is a plan view of the trigger lever of the drive mechanism.
Figure 37:
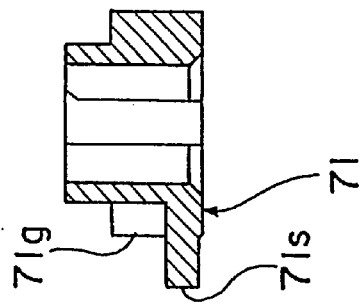
FIG. 37 is a vertical section view of the trigger lever through line Y37—Y37 in FIG. 36.

As shown in detail in FIG. 35 to FIG. 37, the trigger lever 71 comprises a base 71b fit rotatably on the stud 20s, a partial gear 71g formed to part of the outside of the base 71b, and a pair of engaging arms 71a for engaging the cam gear 30. A stop 71s for engaging claw 73d of rocking lever 73 is provided on the outside of the trigger lever base 71b.

The partial gear 71g is for engaging the power transfer path switching rack 42 part of the feed rack 40. The engaging arm 71a is also disposed so that it can engage the hook 32 protruding from the outside of the cam gear 30.

Figure 38:
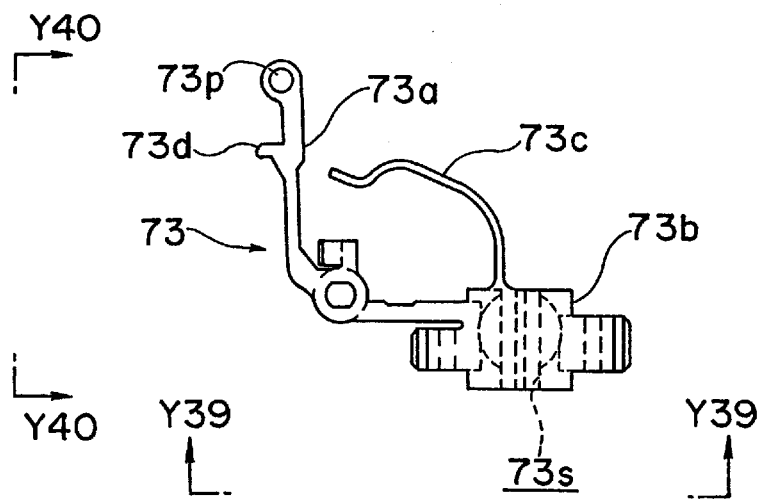
FIG. 38 is a plan view of a rocker lever of the drive mechanism.
Figure 39:
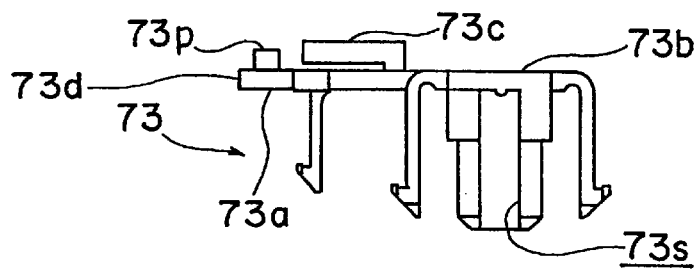
FIG. 39 is a side view of the rocker lever shown in a direction of arrows Y39—Y39 in FIG. 38.
Figure 40:
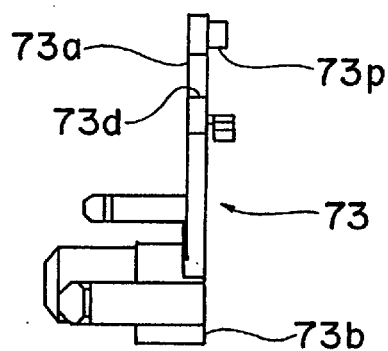
FIG. 40 is a side view of the rocker lever shown in a direction of arrows Y40—Y40 in FIG. 38.

As shown in detail in FIG. 38 to FIG. 40, the rocking lever 73 comprises a base 73b that is fit and fastened at the front of traverse base 20, a lever part 73a extending in a basic L shape from the base 73b, and a spring part 73c extending basically in an arc from the base 73b. A claw 73d for engaging the stop 71s of trigger lever 71, and a pin 73p protruding upward, are integrally molded to the lever part 73a. A guide slot 73s through which the regulating rod 75s of positioning rod 75 slides freely is also formed in the base 73b.

Figure 30:
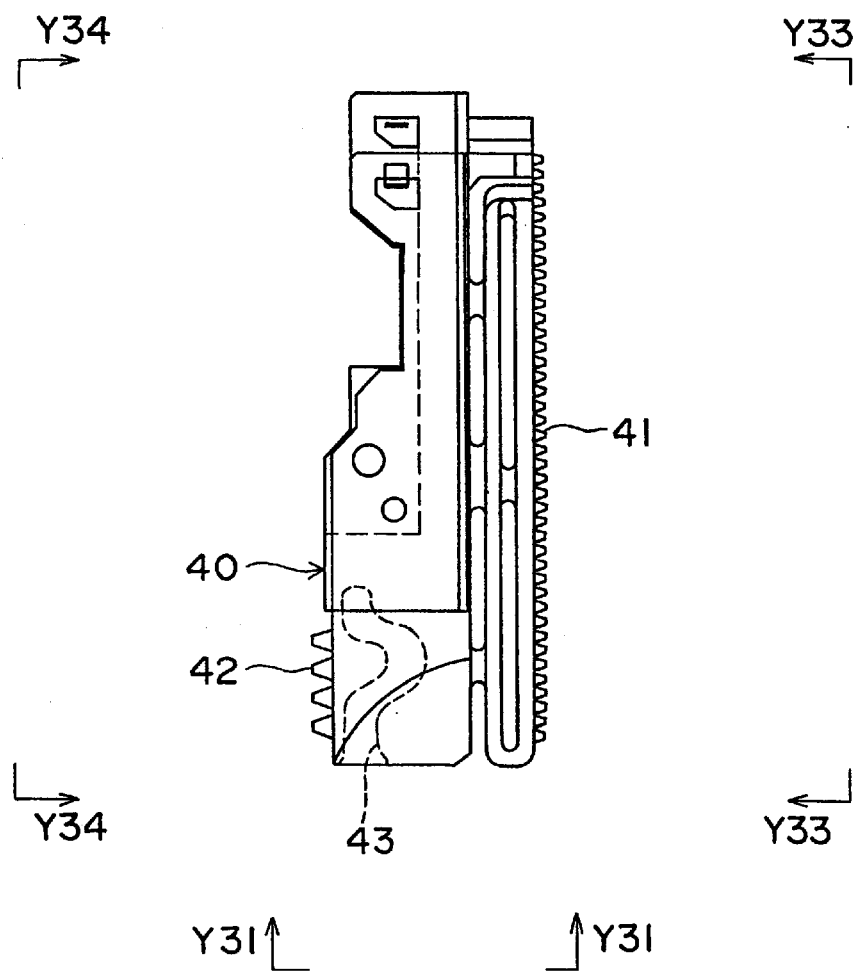
FIG. 30 is a plan view of a feed rack of the drive mechanism.
Figure 31:
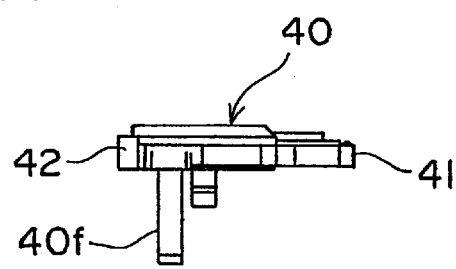
FIG. 31 is a side view of the feed rack shown in a direction of arrows Y31—Y31 in FIG. 30.
Figure 32:
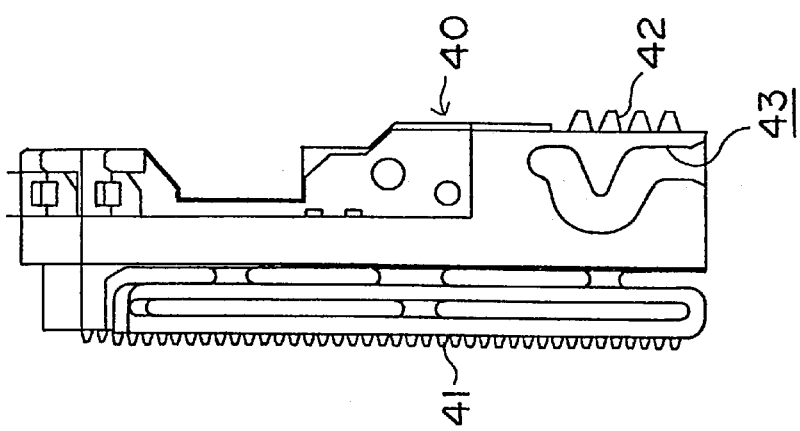
FIG. 32 is a back view of the feed rack.
Figure 33:
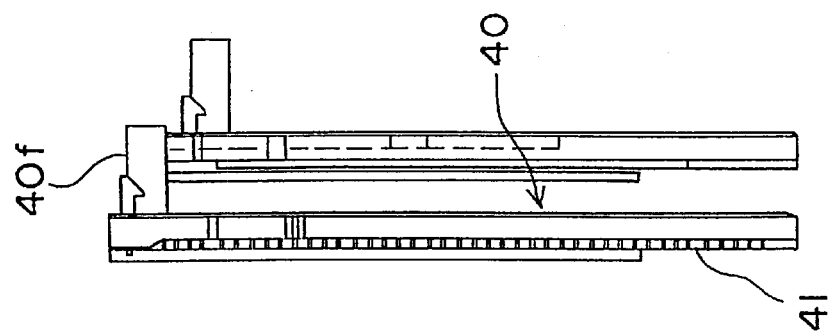
FIG. 33 is a side view of the feed rack shown in a direction of arrows Y33—Y33 in FIG. 30.
Figure 34:
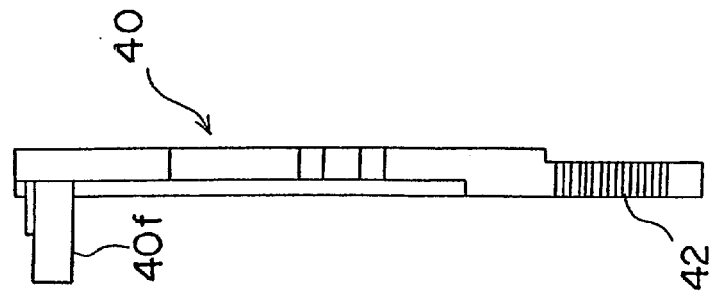
FIG. 34 is a side view of the feed rack shown in a direction of arrows Y34—Y34 in FIG. 30.

As will be known from FIG. 30 and FIG. 32, a cam channel 43 with a curved shape when seen in plan view is provided in the back of the feed rack 40. The front end of the cam channel 43 is open to the front of the feed rack 40. The pin 73p of rocking lever 73 is thus able to engage and slide freely through this cam channel 43.

A positioning mechanism for precisely maintaining engagement of the various components disposed to the drive base 10 and traverse base 20 is also provided on the drive base 10 and traverse base 20.

Figure 41:
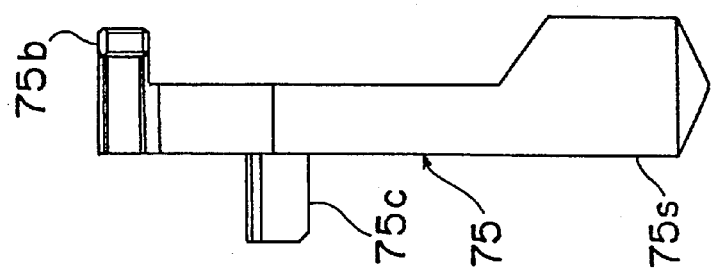
FIG. 41 is a side view of the rocker lever shown in a direction of arrows Y41—Y41 in FIG. 42.
Figure 42:
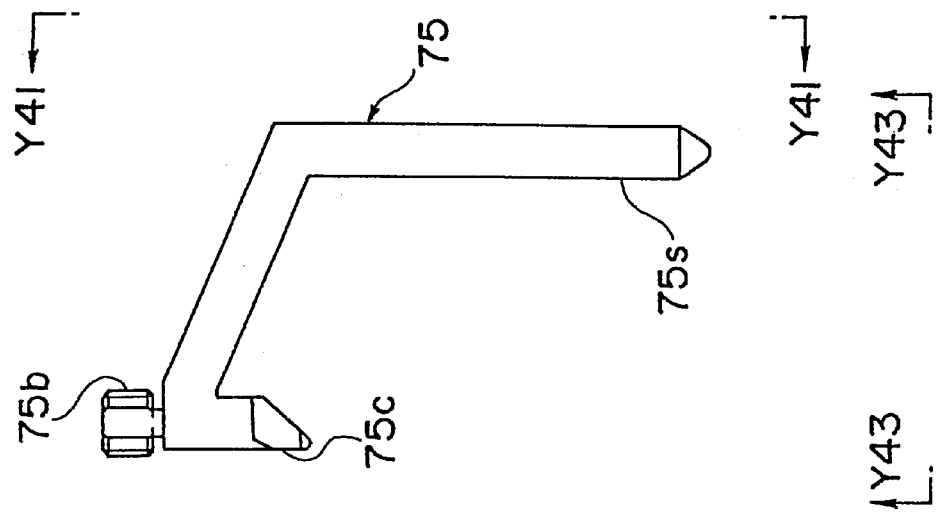
FIG. 42 is a plan view of the rocker lever of the drive mechanism.
Figure 43:
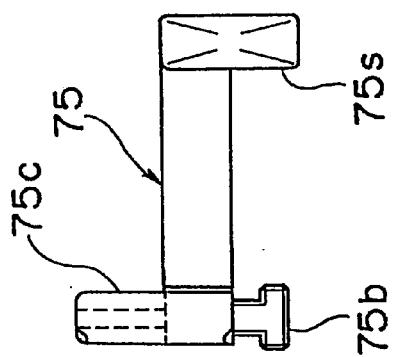
FIG. 43 is a side view of the rocker lever shown in a direction of arrows Y43—Y43 in FIG. 42.

More specifically, a positioning member 75 (positioning rod) for positioning the traverse base 20 side to side to the drive base 10 is disposed to the front of the traverse base 20. As shown in detail in FIG. 41 to FIG. 43, this positioning rod 75 comprises an engaging base 75b for engaging and sliding freely front-back in the front-back guide channel 26 formed in the top of traverse base 20, extension 75c projecting forward from the engaging base 75b, and regulating rod 75s extending front-back (top-bottom as seen in FIG. 14 to FIG. 18) at a position offset to the right from the engaging base 75b and extension 75c.

As noted above, this regulating rod 75s is inserted through and slides freely front-back in the guide slot 73s formed in the base 73b of rocking lever 73. As described more fully below, after assembly the front of the extension 75c contacts spring part 73c of rocking lever 73 and is pushed thereby to the back. The back of the extension 75c can also contact the front of the feed rack 40 so that as the feed rack 40 moves to the front, the entire positioning rod 75 also moves to the front.

As shown in FIG. 14 to FIG. 18, a positioning channel 13 into which the regulating rod 75s of the positioning rod 75 can enter and fit is provided in the front end wall of the internal space 10H of drive base 10. When the feed rack 40 moves further than a specific distance to the front, the front of the feed rack 40 contacts and pushes on the back of the extension 75c of positioning rod 75, causing the entire positioning rod 75 to advance with the engaging base 75b following the guide channel 26. This causes the regulating rod 75s to fit into the positioning channel 13 of the drive base 10, and thus accurately positions the traverse base 20 side to side to the drive base 10.

A cam channel 27 (arc channel) shaped like an arc when seen in plan view is also provided in the top at the front of the traverse base 20. An engaging protrusion 32p is also provided on the back of the hook 32 on cam gear 30. This engaging protrusion 32p engages the arc channel 27, and thus limits the front-back position of the traverse base 20 to the drive base 10.

The vertical positioning between the front of the traverse base 20 and the drive base 10 is also accurately controlled by the protrusion 20P provided at the front of traverse base 20 engaging the cam channel 33 of cam gear 30.

The position of the front of traverse base 20 to the drive base 10 is thus accurately determined in three perpendicular directions, that is, side to side, front to back, and vertically, and the components mounted on the drive base 10 and traverse base 20 can be accurately and reliably engaged with corresponding parts. It is therefore possible when switching the transfer path of second motor 4 drive power to accurately maintain linkage between the disk loading mechanism on the drive base 10 and the loading drive mechanism on the traverse base 20.

The disk drive 1 also has a clamping plate 95 with an assembled damper 96 for clamping a disc 9 to the turntable 5 (see FIGS. 1, 2, 4, 22, and 23). The damper 96 has a magnet 97 in the center thereof, and felt 98 affixed to the disk contact surface on the bottom of the damper 96.

A claw 95d is formed at each of the plurality of mounting arms 95f (two are provided at front and back respectively in this exemplary embodiment) disposed to right and left sides of the clamping plate 95. The clamping plate 95 is assembled to the drive base 10 by engaging these claws 95d with the sides of the drive base 10. By thus assembling the clamping plate 95 to the drive base 10, the center of the damper 96 can be centered with the center of turntable 5 rotation.

The clamping plate 95 comprises right and left horizontal bases 95b for supporting mounting arms 95f on the same right and left sides, a substantially annular center holder 95a for supporting the clamper 96, and a horizontal connector 95c for connecting the holder 95a to the bases 95b.

A notch 95e is formed on each side between the base of the holder 95a and the corresponding horizontal bases 95b. The width of each horizontal connector 95c is less than the width of the horizontal base 95b by an amount corresponding to the notch 95e. This gives the horizontal connectors 95c less rigidity than the horizontal bases 95b, and makes it easier for the horizontal connectors 95c to bend vertically.

When the disk drive 1 is dropped, for example, exposing the disk drive 1 to a large shock such that the turntable 5 contacts the clamping plate 95, the clamping plate 95 is able to easily flex in the vertical direction, thus absorb the force of impact, and therefore effectively prevent the turntable 5 (and spindle motor 3 linked to the turntable 5) from suffering major damage.

The operation of a disk drive 1 thus comprised is described next below.

When a disc 9 is loaded into the disk drive 1 and a signal recorded to the disc 9 is being reproduced by the optical pickup 6 (see FIG. 9), the traverse base 20 is supported substantially parallel to the drive base 10 as shown in FIG. 6 by means of the protrusion 20P at the front edge of the traverse base 20 fit into the top horizontal channel 33a of the cam channel 33 in cam gear 30.

Figure 14:
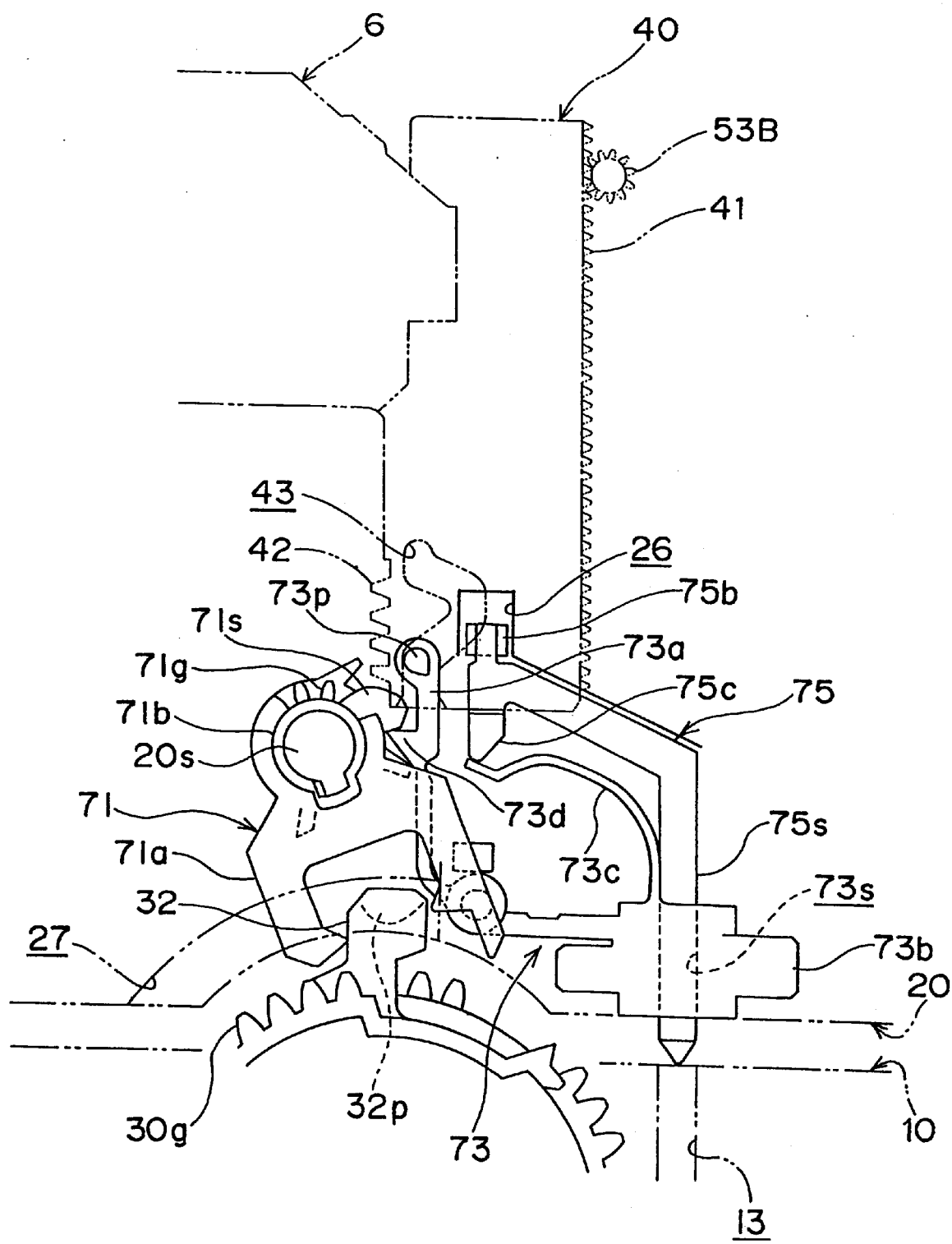
FIG. 14 to FIG. 18 are a sequence of enlarged plan views showing the drive power transfer path switching operation of the drive mechanism in the optical disk drive shown in FIG. 1.

The stop 71s of the trigger lever 71 is engaged with the claw 73d of rocking lever 73, and the engaging arm 71a engages the hook 32 of cam gear 30, at this time as shown in FIG. 14. When thus engaged, the trigger lever 71 is turned all the way clockwise in FIG. 9 and FIG. 14.

To read a signal from the disc 9 in this position, the spindle motor 3 is driven to spin the turntable 5 on which the disc 9 is loaded at a specific speed, the optical pickup 6 is moved to a position below the signal track to be reproduced, and the optical elements (that is, the optical system including a laser and lens) of the optical pickup 6 are operated to read the desired signal from the disc 9.

If the signal track to be reproduced is not above the current optical pickup 6 position, or if signals are to be read from some plurality of signal tracks, the optical pickup 6 must be moved appropriately toward the inside circumference of the disc 9, that is, toward the front of the disk drive 1, or the outside circumference of the disc 9, that is, toward the back of the disk drive 1.

The optical pickup 6 is moved by means of the optical pickup drive mechanism. As described above, the second motor 4 is therefore driven and the motor gear 4G turns. Rotation of the motor gear 4G is speed reduced at a specific speed reduction ratio and transferred to the output side by the rack drive gear set 51, thereby causing the final output gear 53B (second traverse output gear) to turn at a reduced speed and moving the feed rack 40 and the optical pickup 6 linked thereto front or back. If the motor gear 4G turns counterclockwise in FIG. 9 to FIG. 13, the optical pickup 6 moves forward (downward in FIG. 9 to FIG. 13) toward the inside circumference of the disc 9. If the motor gear 4G turns in the opposite direction, the optical pickup 6 moves to the back (upward in FIG. 9 to FIG. 13) toward the outside circumference of the disc 9.

It should be noted that the loading drive gear set 61 also turns in conjunction with second motor 4 operation during this signal reproduction mode, but the teeth of the third loading gear 64, that is, the final output gear of the gear set 61, are positioned at the smooth part 34 of the cam gear 30 and thus do not engage the cam gear teeth 30g. Drive power from the second motor 4 is therefore not transferred to the cam gear 30, and hence to the tray drive gear 56, in this signal reproduction mode.

Figure 10:
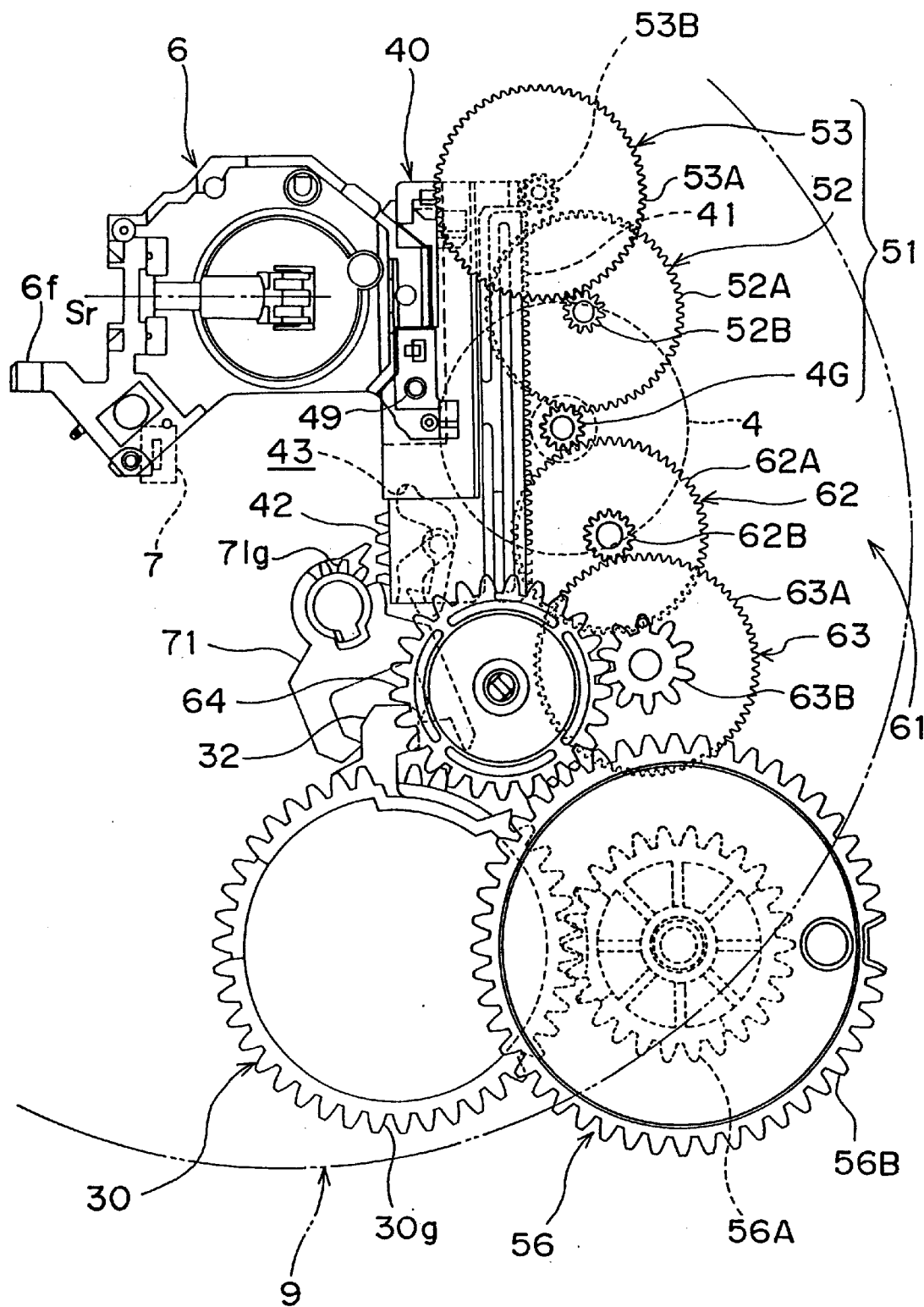
Figure 15:
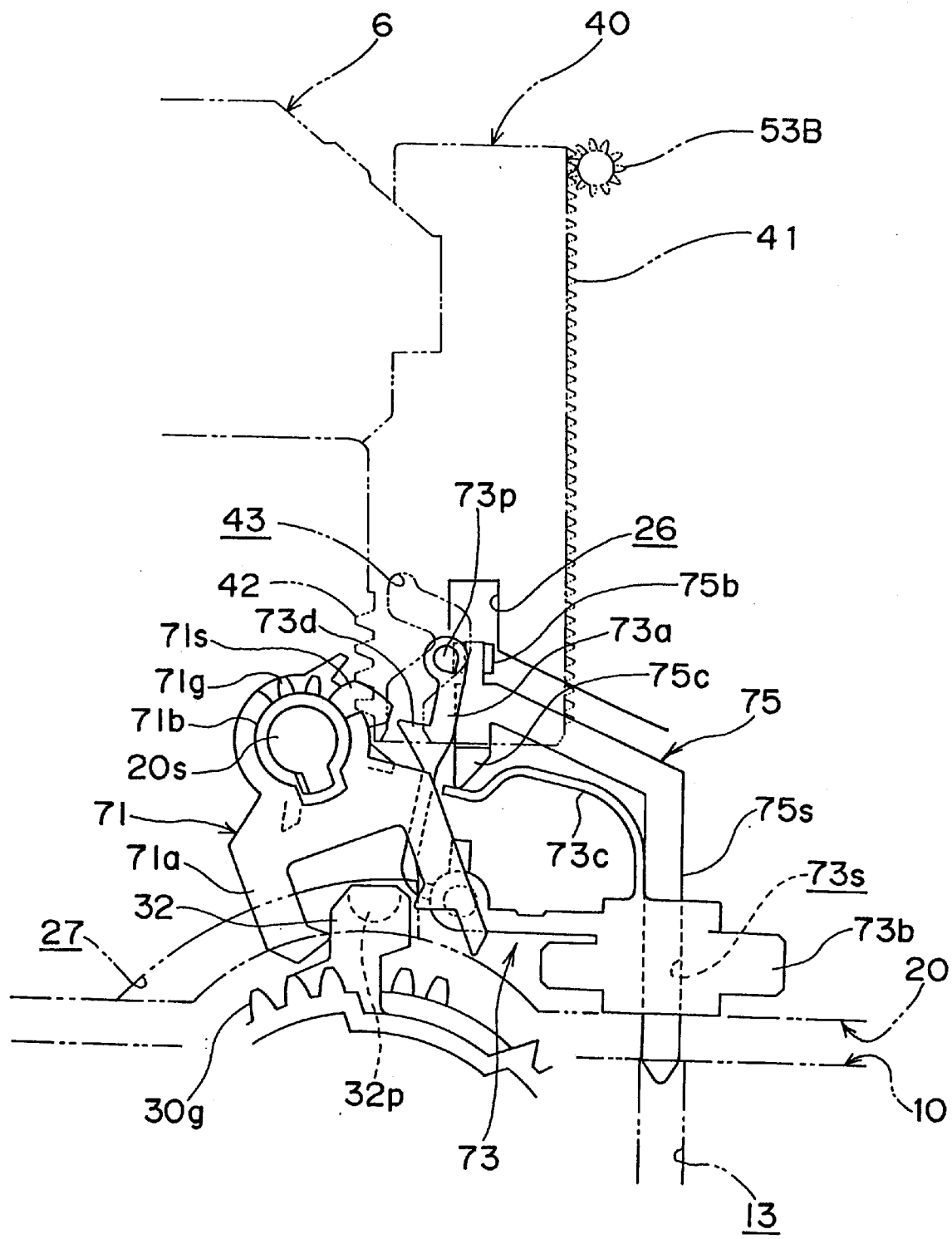

FIG. 10 and FIG. 15 show the drive train when positioned for reading a signal recorded to the most inside circumference part of the recording position range (data signal recording area) of the disc 9. When positioned to read from this disc area, the optical pickup 6 is moved forward by the optical pickup drive mechanism to the inside circumference edge Sr of the data signal recording area of the disc 9, and the back end of the driven rack part 41 of the feed rack 40 is engaged with the final output gear 53B (second traverse output gear) of the rack drive gear set 51. The power transfer path switching rack 42 is also extremely close to the partial gear 71g of trigger lever 71.

The data signal recording area of an optical disc 9 is commonly determined by the distance from the disc center based on the disk format standard. A conventional disk drive also has an optical pickup position detector disposed at a position corresponding to the most inside circumference position of the data signal recording area to detect whether the optical pickup is at this most inside circumference position or has moved thereto so that the optical pickup can be prevented from moving beyond this point further towards the inside circumference of the disc.

In contrast to this conventional design, a disk drive 1 according to this preferred embodiment has an inside circumference detection switch 7 disposed at the inside circumference edge Sr of the data signal recording area of the disc 9, and uses the inside circumference edge Sr as an inside circumference edge switching position. When off, this inside circumference detection switch 7 operates the same as in a conventional optical disk drive to detect whether the optical pickup is at this most inside circumference position or has moved thereto. What differs from the conventional disk drive is that when the inside circumference detection switch 7 is on, movement of the optical pickup 6 beyond the inside circumference edge Sr is not limited when the optical pickup 6 trips the inside circumference detection switch 7, and the optical pickup 6 can therefore be purposely moved further to the inside circumference of the disc 9.

The inside circumference detection switch 7 operates mechanically in the same manner as a common conventional detector, and is disposed to project and retract vertically to the top of the traverse base 20. When the optical pickup 6 reaches a position above the inside circumference detection switch 7, the bottom of the optical pickup 6 interferes with the switch 7, causing the inside circumference detection switch 7 to be pushed into the traverse base 20 in resistance to the pressure of a switch spring (not shown in the figure). It should be noted that this inside circumference detection switch 7 shall not be limited to a mechanical device such as described above, and can alternatively be a non-contact detector or any of various other known designs.

Figure 11:
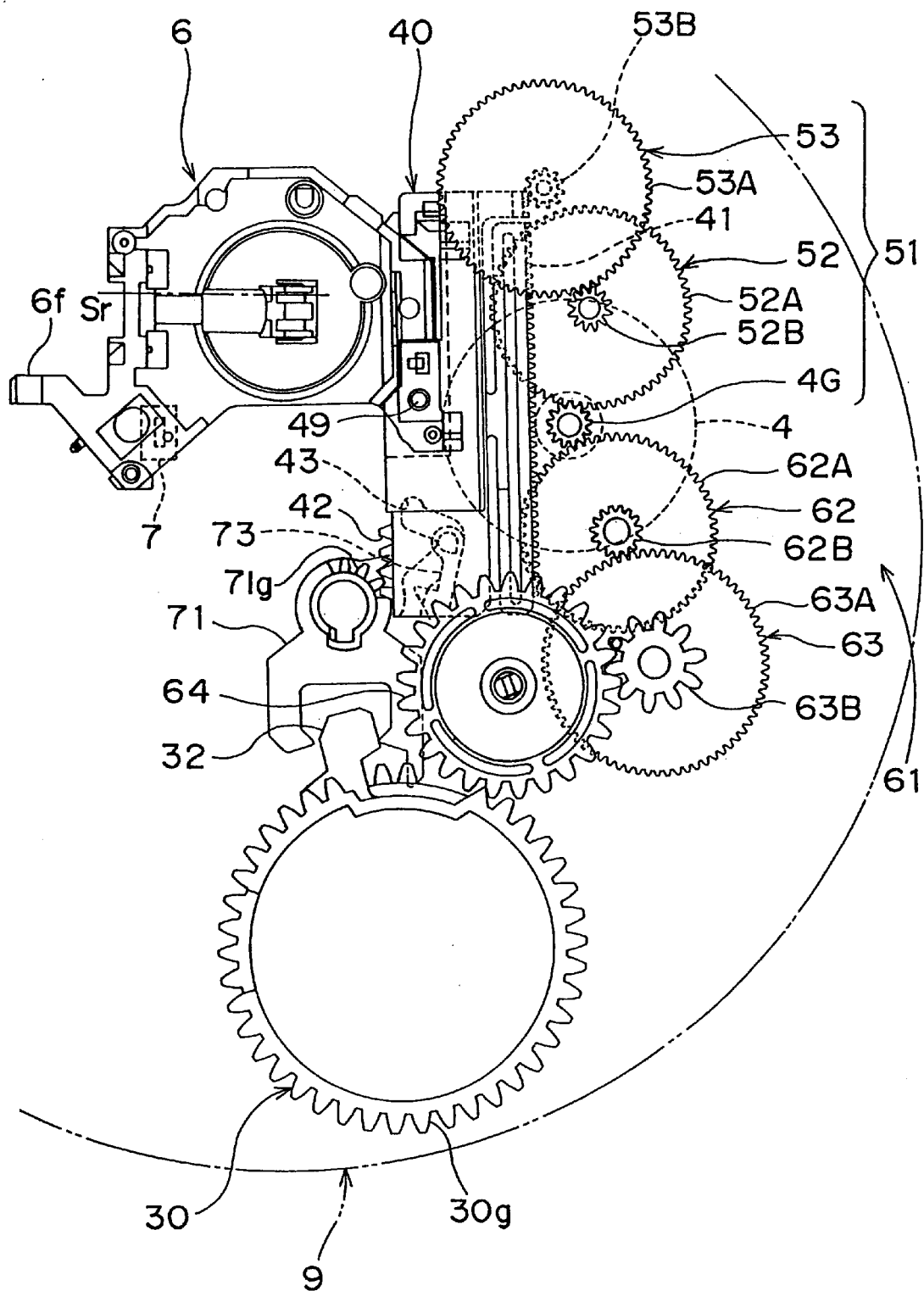
Figure 16:
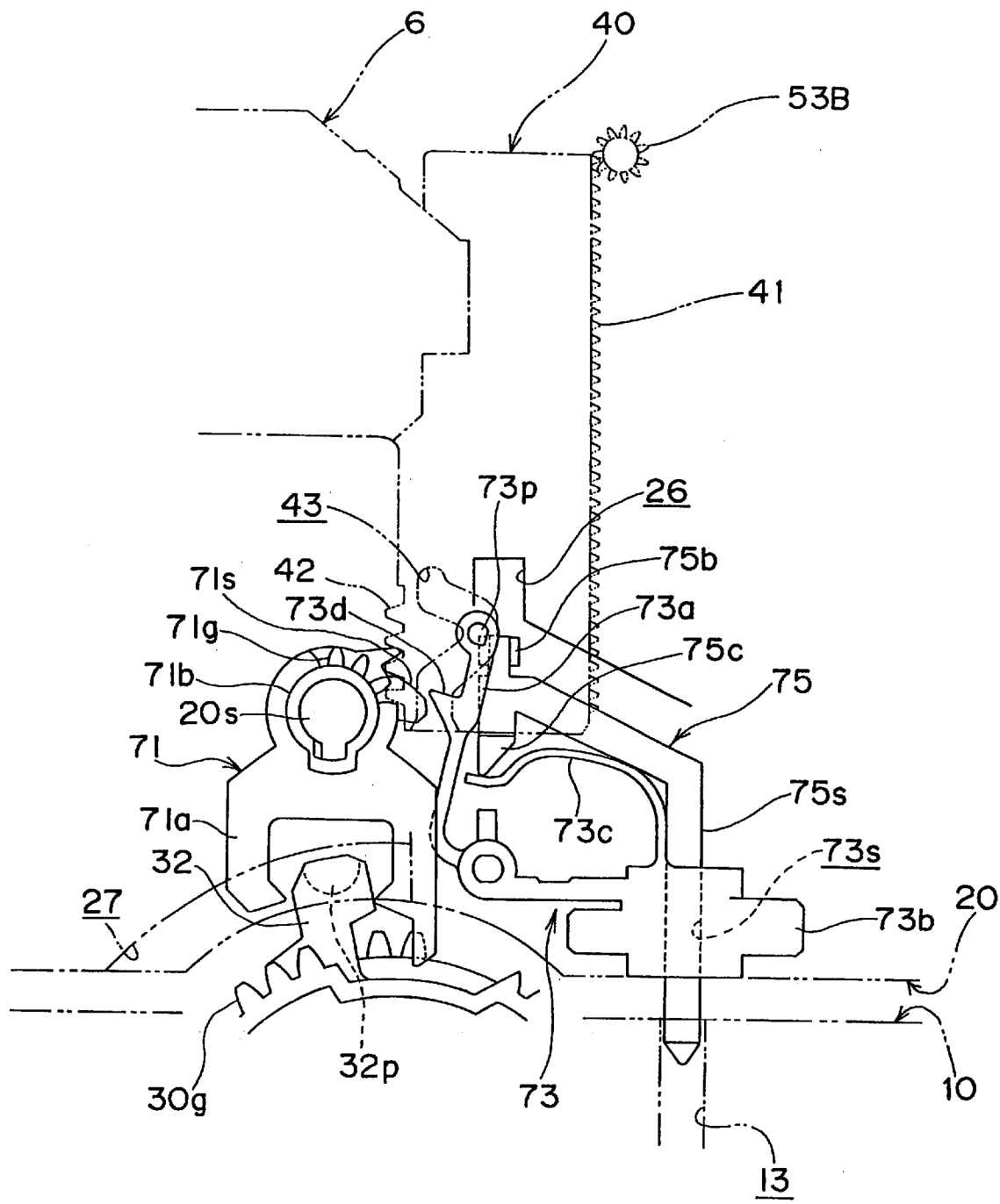

FIG. 11 and FIG. 16 show the optical pickup 6 after it has moved to the inside circumference edge Sr, operated the inside circumference detection switch 7, and then moved beyond this position farther to the inside circumference of the disc 9.

The differences between the state shown in FIGS. 10 and 15 and the state shown in FIGS. 11 and 16, as well as the movement to these states, are described next below.

The optical pickup 6 is moved from the state shown in FIGS. 10 and 15 to the state shown in FIGS. 11 and 16 by continuing to drive the second motor 4 in the same direction (counterclockwise in this case) from the state shown in FIGS. 10 and 15 after the optical pickup 6 operates the inside circumference detection switch 7 set to the on state.

By thus moving the optical pickup 6 further to the inside circumference, the power transfer path switching rack 42 of the feed rack 40 moving the optical pickup 6 front-back engages the partial gear 71g of trigger lever 71, and turns the trigger lever 71 clockwise. In conjunction with this the engaging arm 71a of trigger lever 71 turns the hook 32 of cam gear 30 counterclockwise.

The cam gear 30 thus turns counterclockwise, and the cam gear teeth 30g begin to engage the final output gear 64 (third loading gear) of the loading drive gear set 61. The driven rack part 41 of the feed rack 40 is still engaged with the final output gear 53B (second traverse output gear) of the rack drive gear set 51 at this time.

The rocking lever 73 engaged with the stop 71s of the trigger lever 71 to position and hold the trigger lever 71 also turns as a result of the rocking lever pin 73p following the cam channel 43 of feed rack 40. As a result, the claw 73d releases the trigger lever 71.

Figure 12:
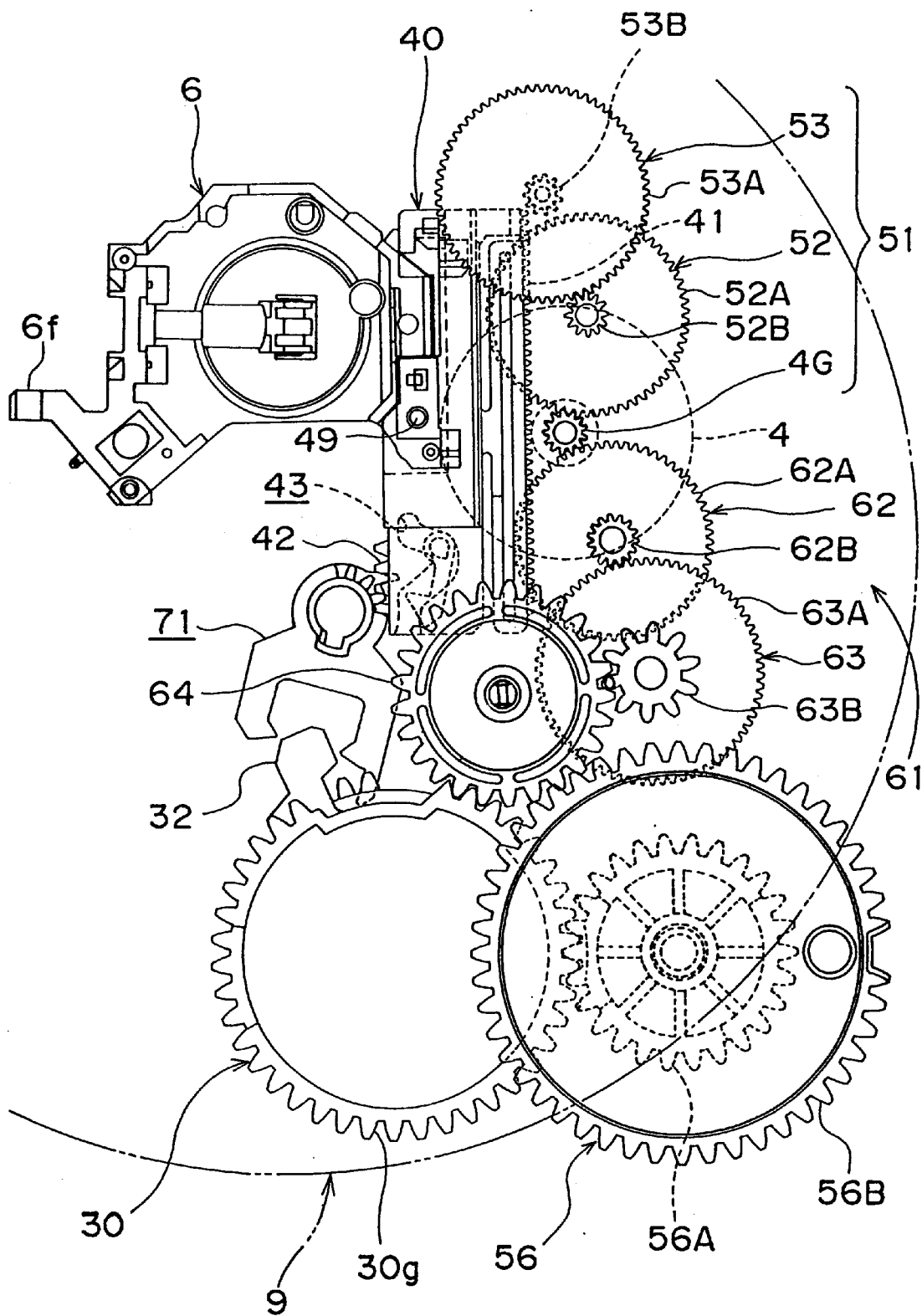
Figure 17:
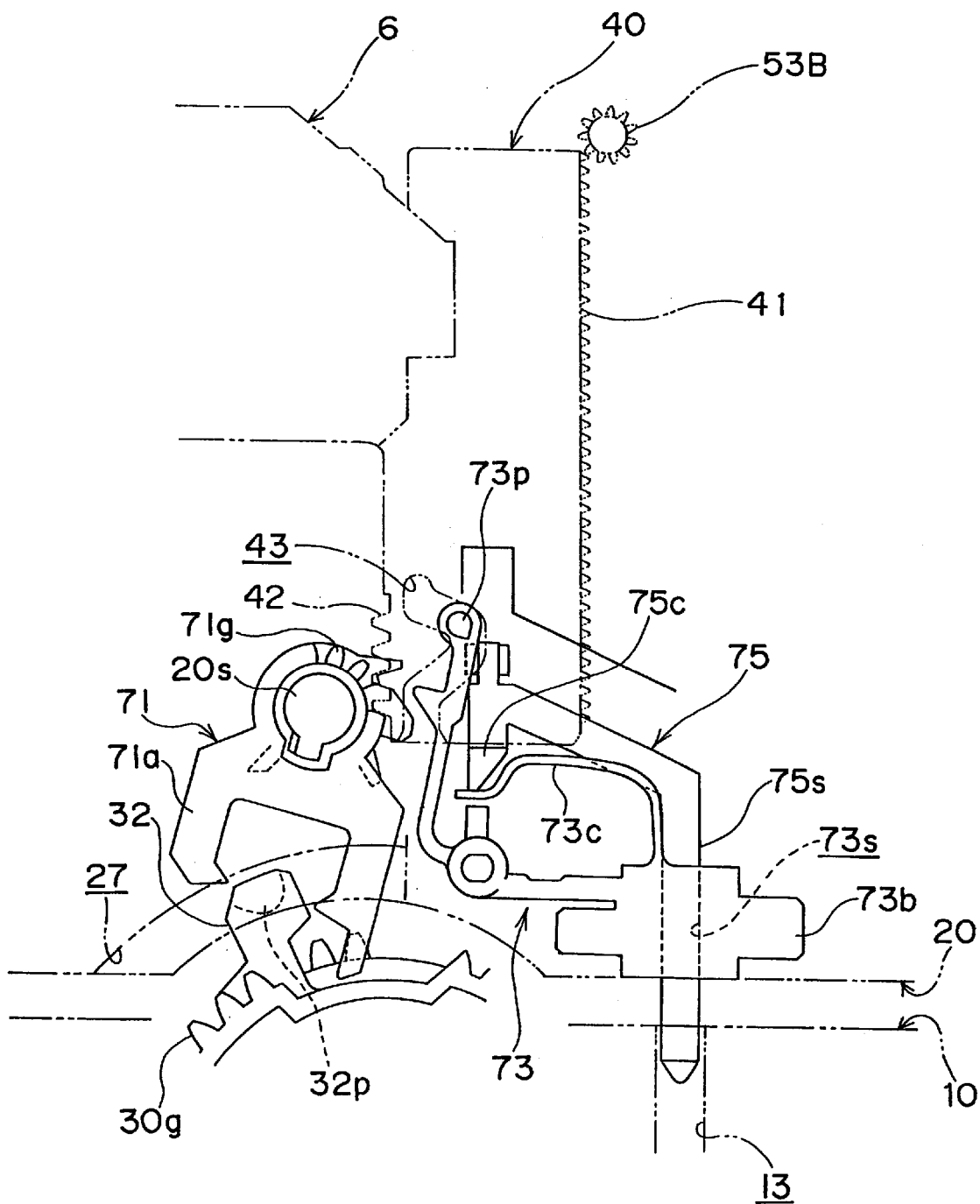

FIG. 12 and FIG. 17 show the state in which the cam gear 30 is turned counterclockwise by drive power from the third loading gear 64 from where the cam gear 30 begins to engage the final output gear 64 (third loading gear) of the loading drive gear set 61.

This operation is also accomplished by the motor gear 4G of second motor 4 turning counterclockwise, that is, in the same direction in which the motor gear 4G turns to move the optical pickup 6 to the inside circumference.

This operation of the cam gear 30 turns the trigger lever 71 clockwise to a position limited by the cam gear 30, thus drawing the optical pickup 6 to a further inside circumference position (forward position) until the driven rack part 41 of the feed rack 40 disengages the second traverse output gear 53B. As a result, further counterclockwise rotation of the motor gear 4G, and hence drive power from the second motor 4, is not transferred to the feed rack 40, that is, to optical pickup 6 movement.

The pin 73p of rocking lever 73 is guided along the cam channel 43 of feed rack 40 to enter the inclined part of the cam channel 43 at this time, and is thus turned counterclockwise by the spring tension of the rocking lever 73. The trigger lever 71 continues to be turned clockwise until it completely separates from the cam gear 30.

It should be noted that basically the trigger lever 71, rocking lever 73, and cam gear 30 (or more specifically the hook 32 and smooth part 34 of the cam gear 30), as well as more specifically the power transfer path switching rack 42 and cam channel 43 of the feed rack 40, combine to form a power transfer path switching mechanism for switching the transfer path of second motor 4 drive power.

As described above, the feed rack 40 can move the optical pickup 6 to an inside circumference edge Sr position at the inside circumference limit of the data signal recording area of the disc 9, and can then continue moving the optical pickup 6 beyond this position closer to the inside circumference of the disc 9. Furthermore, the second motor 4 drive power transfer path is switched by the feed rack 40 moving to this specific position at the inside circumference or moving from this specific position toward the outside circumference of the disc. As a result, drive power from a single motor (the second motor 4) can be used to power the signal reading operation of the optical pickup 6, as well as switching the drive power transfer path of the second motor 4.

Furthermore, by continuing to drive the same motor 4 without changing the direction of shaft rotation after moving the optical pickup 6 for signal reproduction to the inside circumference edge Sr of the data signal recording area of the disc 9, the disc 9 is automatically unclamped from the turntable 5 so that the disc 9 can be ejected from the disk drive. It is therefore possible to eliminate the dedicated disk loading motor required for disk loading and unloading in a conventional optical disk drive. It is therefore possible to provide a less expensive disk drive by thus reducing the number of motors used in the disk drive.

Furthermore, by changing the direction of second motor 4 operation or simply stopping the second motor 4 after the optical pickup 6 has been moved to the inside circumference edge Sr of the data signal recording area of the disc 9 and the position of the optical pickup 6 has been detected by the inside circumference detection switch 7, it is possible to not eject the disc 9 from the disk drive and continue reading or writing signals to the same disc 9.

The number of detectors or detection switches used in the disk drive can also be reduced, and a lower cost optical disk drive can therefore be provided, because the inside circumference detection switch 7 can be used to detect if a disk has been loaded into the disk drive and if the disk has been clamped, and dedicated detectors used in a conventional disk drive for these detection purposes can therefore be eliminated.

The traverse base 20 in a disk drive according to this preferred embodiment is designed to swing up and down on the back end of the base while a protrusion 20P at the front end engages a cam channel 33 in the cam gear 30. As described above, this cam channel 33 comprises top and bottom horizontal channels 33a and 33c and a diagonal channel 33b connecting these horizontal channels (see FIG. 24 to FIG. 29). The vertical position of the front of the traverse base 20 is determined by what part of these three channels 33a to 33c the protrusion 20P is engaged with, that is, by the direction and distance of cam gear 30 rotation. The traverse base 20 therefore swings up and down around the back edge of the traverse base 20 according to the direction and distance of cam gear 30 rotation.

It will thus be obvious that the traverse base 20 is supported to swing vertically on one edge thereof relative to the drive base 10. More specifically, the cam gear 30 is turned by power transferred from the loading drive gear set 61, causing the other end of the traverse base 20 to move up or down such that the front of traverse base 20 swings up or down relative to the drive base 10. Drive power from one motor, the second motor 4, is thus used to swing the traverse base 20 up and down, and therefore to raise or lower the turntable 5, and spin the disc 9 in conjunction therewith.

Figure 13:
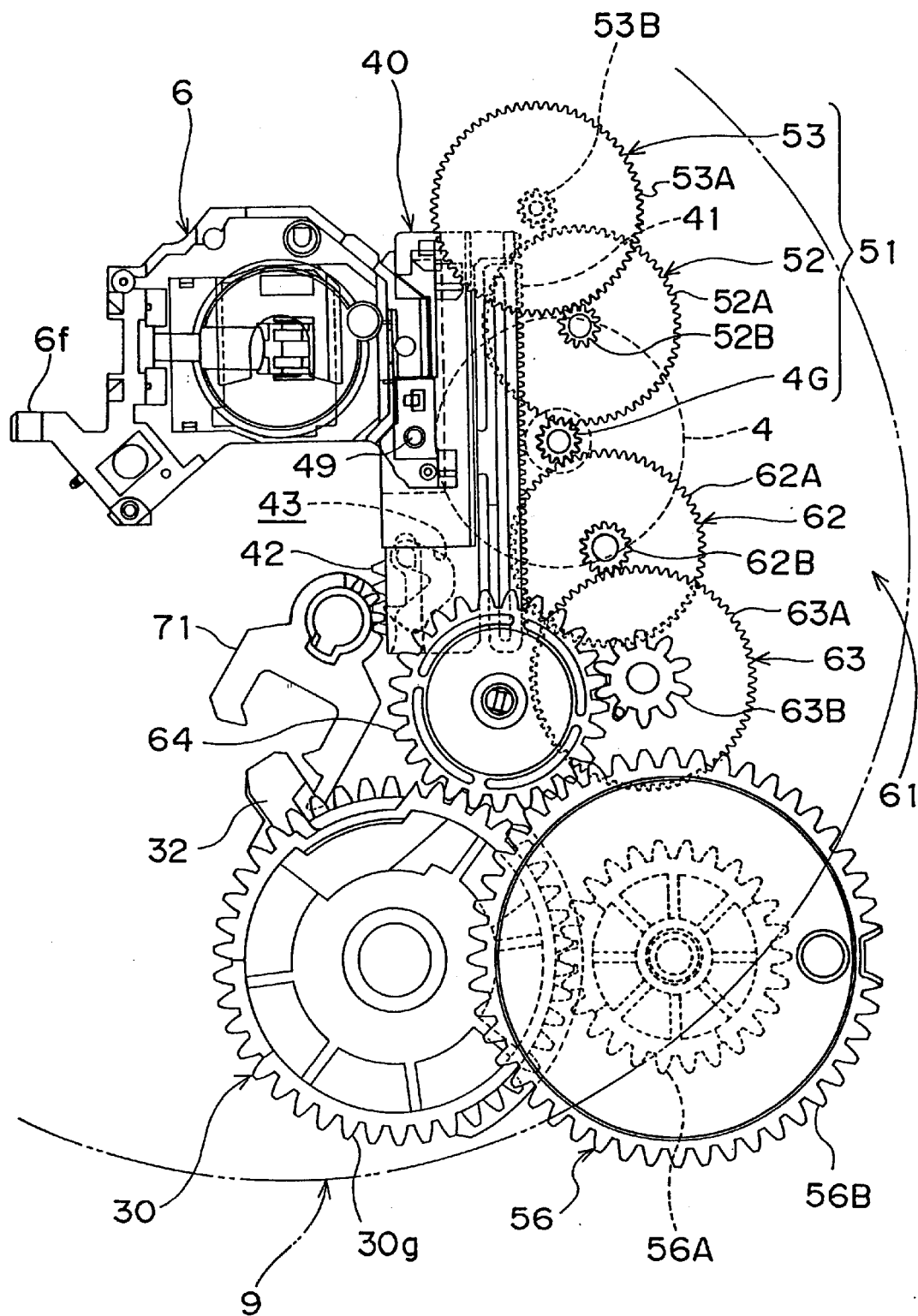
Figure 18:
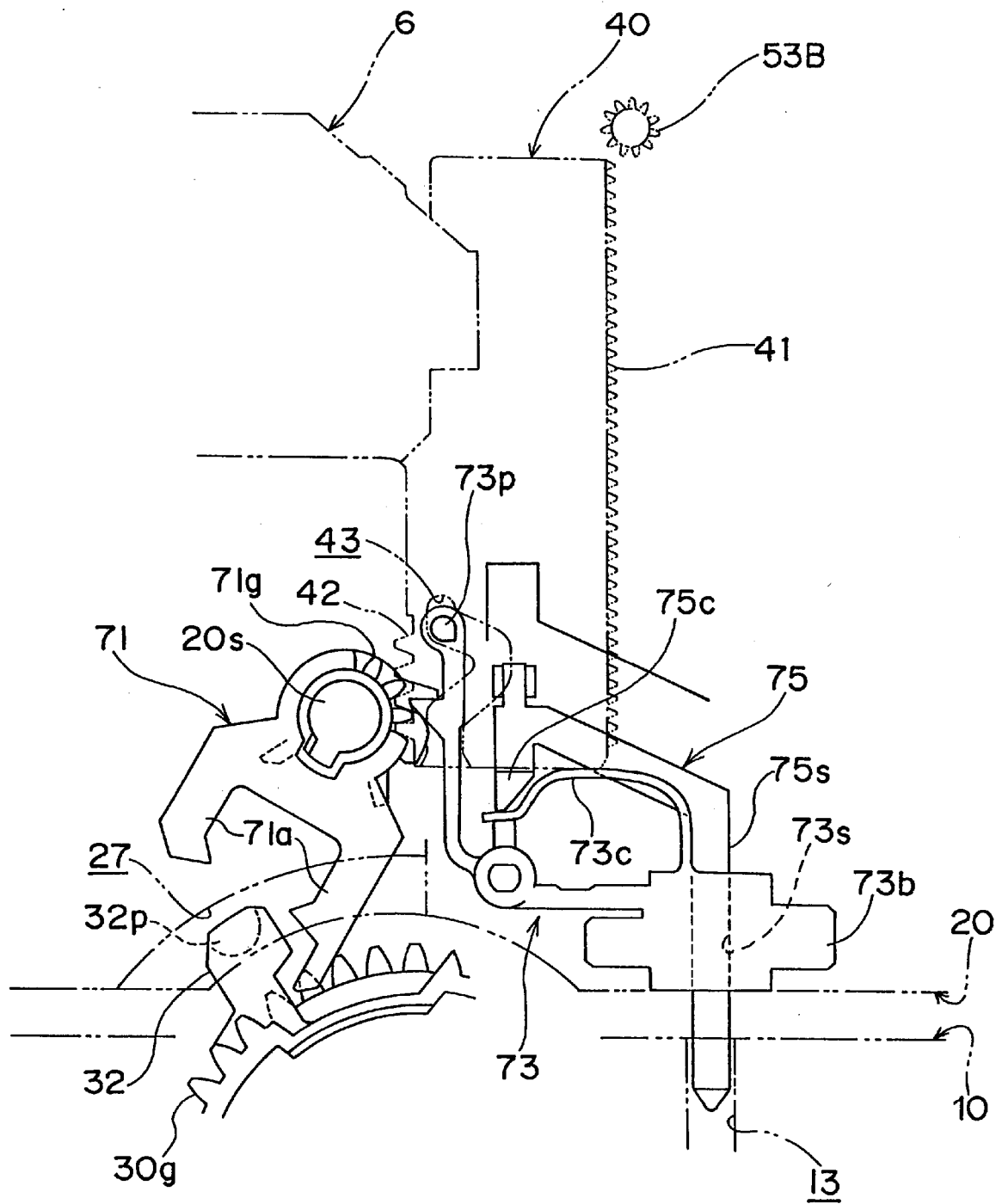

When the cam gear 30 moves further counterclockwise as shown in FIG. 13 and FIG. 18, the position at which the protrusion 20P of traverse base 20 engages the cam channel 33 moves from the top horizontal channel 33a through the diagonal channel 33b to the bottom horizontal channel 33c.

Figure 9:
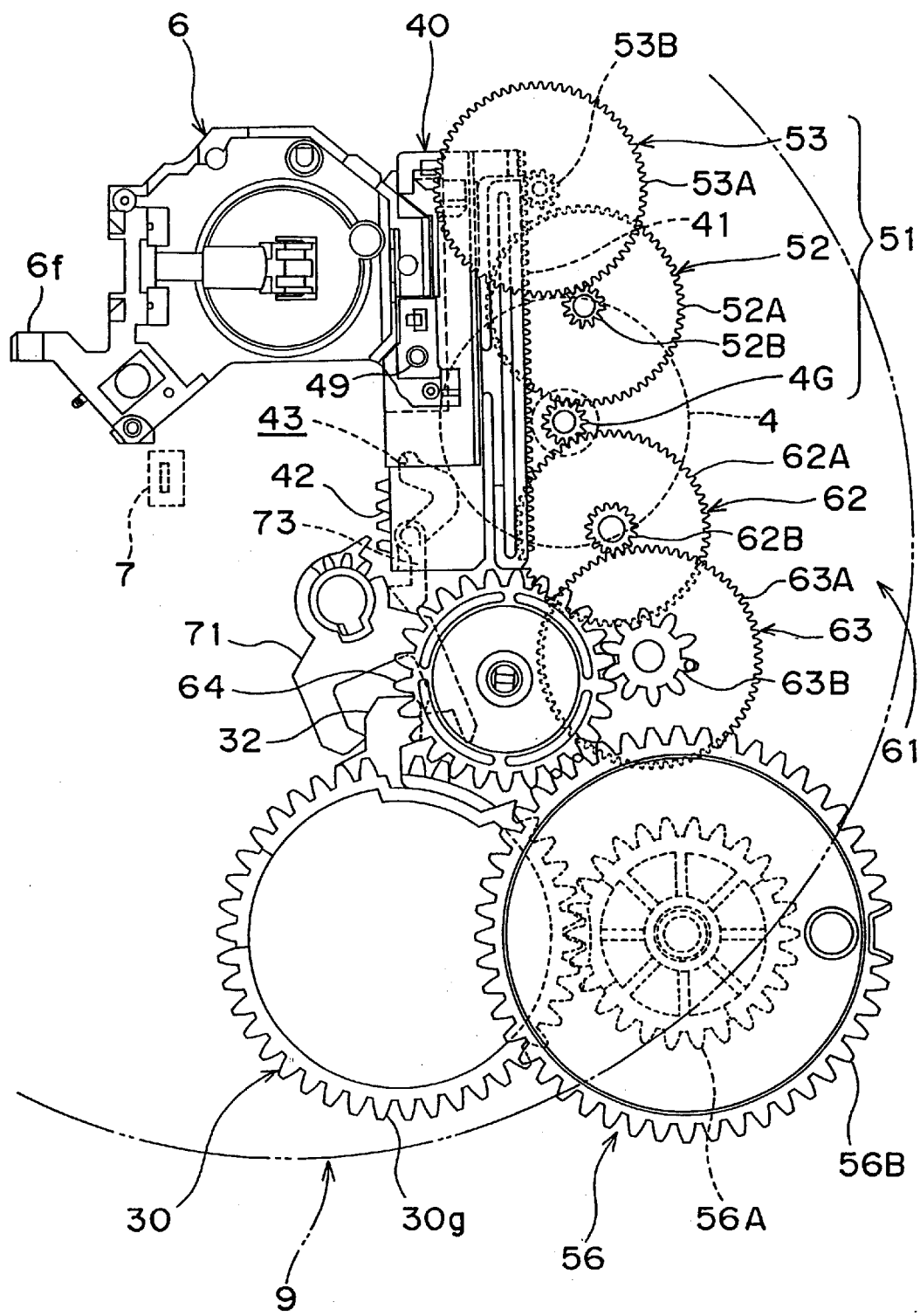
FIG. 9 to FIG. 13 are a sequence of plan views showing the operation of a drive mechanism in the optical disk drive.

When the traverse base 20 is positioned as shown in FIG. 9 and FIG. 14, the protrusion 20P engages top horizontal channel 33a, and the traverse base 20 is held as shown in FIG. 6 parallel to the drive base 10 with the top of the traverse base 20 substantially flush with the top of the drive base 10. The disc 9 can thus be clamped and held level between the turntable 5 and the damper 96.

When the feed rack 40 moves more than a specific distance forward as shown in FIGS. 10 to 13 and FIGS. 15 to 18, the cam gear 30 begins to turn, and the front protrusion 20P of the traverse base 20 passes the diagonal channel 33b to engage the bottom horizontal channel 33c of cam channel 33.

This results in the traverse base 20 swinging down on the back end thereof so that it is inclined to the drive base 10 as shown in FIG. 7. This movement of the traverse base 20 also lowers the turntable 5 to the same downward incline. As a result, a disc 9 can be drawn to a position above the turntable 5 from outside the disk drive 1, or can be ejected from above the turntable 5 to outside the disk drive 1, without the disc 9 interfering with the turntable 5.

When the traverse base 20 is thus inclined down from the drive base 10 to a specific position (the position at which the front protrusion 20P of the traverse base 20 passes the diagonal channel 33b and engages the bottom horizontal channel 33c of cam channel 33), the teeth 30g of cam gear 30 engage the tray drive gear 56 of the disk loading mechanism. The tray 55 is thus driven with the traverse base 20 reliably swung to a downward position.

It is therefore possible to reliably avoid interference between the tray 55 (and disc 9 thereon) and the turntable 5 when the tray is driven (that is, when a disk is loaded or unloaded).

When the traverse base 20 is thus inclined (see FIG. 13, FIG. 18, and FIG. 7), the third loading gear 64 is also inclined and engaged with the teeth 30g of cam gear 30. As noted above and shown in FIG. 29, these teeth 30g have a profile in longitudinal section that is curved or inclined to the axis Lg of the cam gear 30. As a result, gears 64 and 30g can engage reliably and smoothly.

Furthermore, while the feed rack 40 (that is, the optical pickup 6) moves to the front and the traverse base 20 is inclining, the front edge of the feed rack 40 contacts and pushes forward on the back of the extension 75c of positioning rod 75 in conjunction with the forward movement of the feed rack 40 as shown in FIGS. 14 to 18. This causes the regulating rod 75s of the positioning rod 75 to move forward guided by the guide slot 73s in the base 73b of rocking lever 73. Then, as noted above, the regulating rod 75s fits into the positioning channel 13 in drive base 10, and thus positions the traverse base 20 side to side to the drive base 10.

When the feed rack 40 moves in the opposite direction to the back, the force of spring part 73c moves the positioning rod 75 to the back. This is because the front of the extension 75c of positioning rod 75 contacts the spring part 73c of the rocking lever 73, and the spring part 73c thus constantly urges the positioning rod 75 toward the back.

When the traverse base 20 is held substantially parallel to the drive base 10 with the tops thereof substantially flush, the drive base 10 and traverse base 20 are positioned front-back to each other by engagement of the engaging protrusion 32p of hook 32 on cam gear 30 with the cam channel 27 in the front of traverse base 20.

Figure 19:
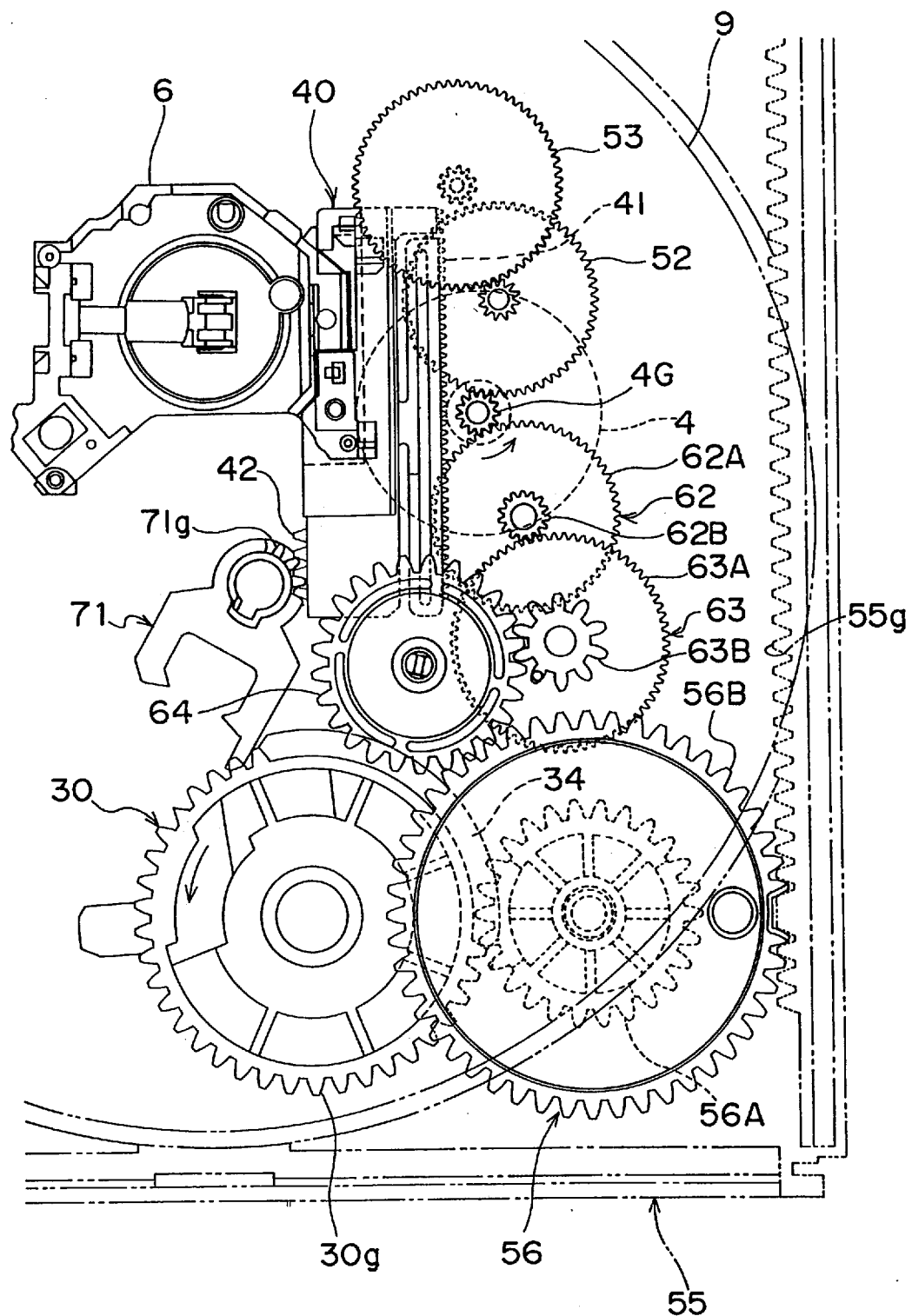
FIG. 19 is an enlarged plan view showing engagement of a tray and a tray drive gear.
Figure 20:
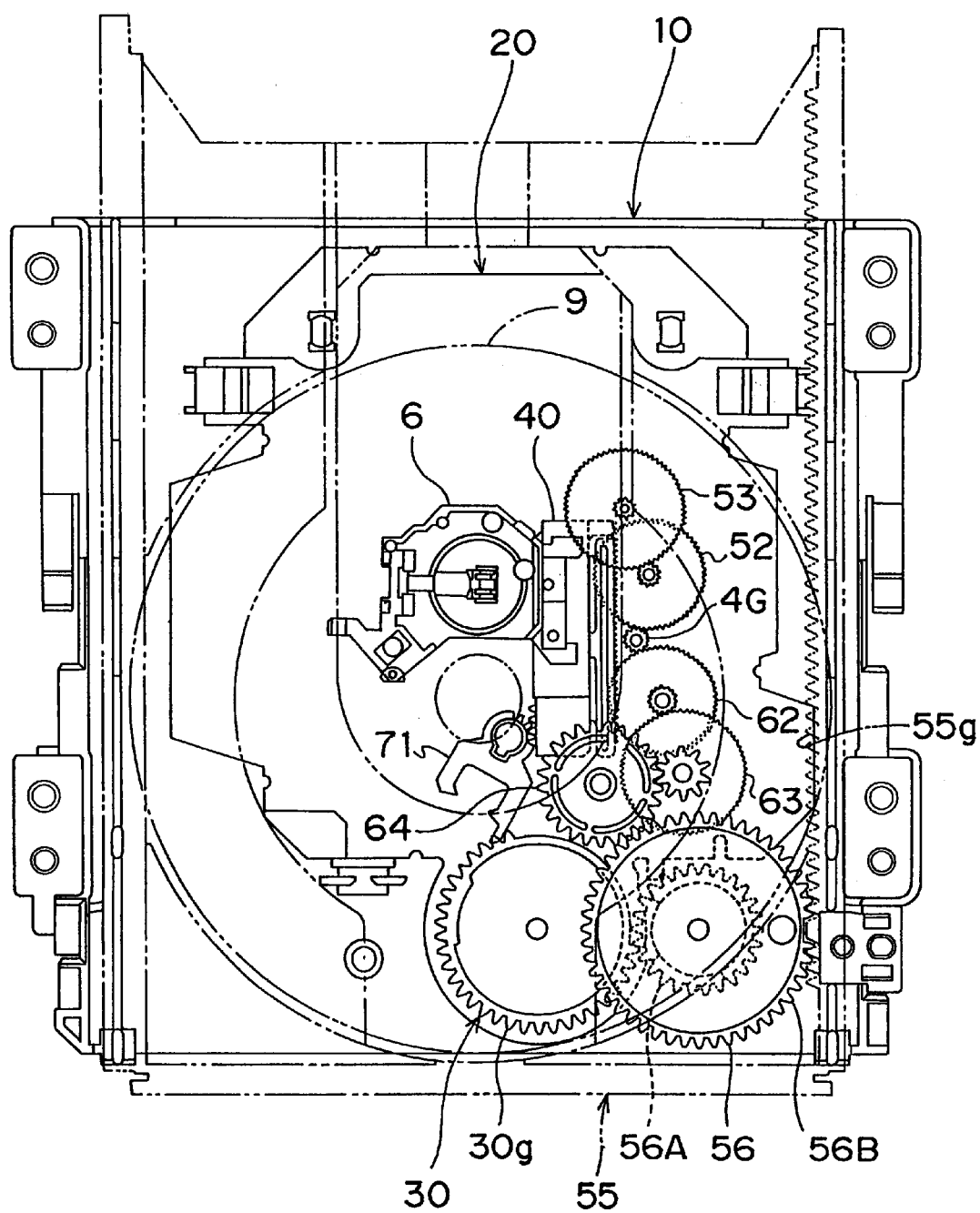
FIG. 20 is a plan view of the optical disk drive with the tray stored inside the drive.

FIG. 19 and FIG. 20 show the state in which the motor gear 4G is driven further in the same direction (counterclockwise) by the second motor 4, and cam gear 30 is turned further counterclockwise by way of intervening loading drive gear set 61. The input gear 56A of tray drive gear 56 does not engage the teeth 30g of traverse base 20, and is positioned to the smooth part 34, in the states shown in FIGS. 9 to 13. Rotation of cam gear 30 is therefore not transferred to the tray drive gear 56, and the tray drive gear 56 does not turn.

Figure 21:
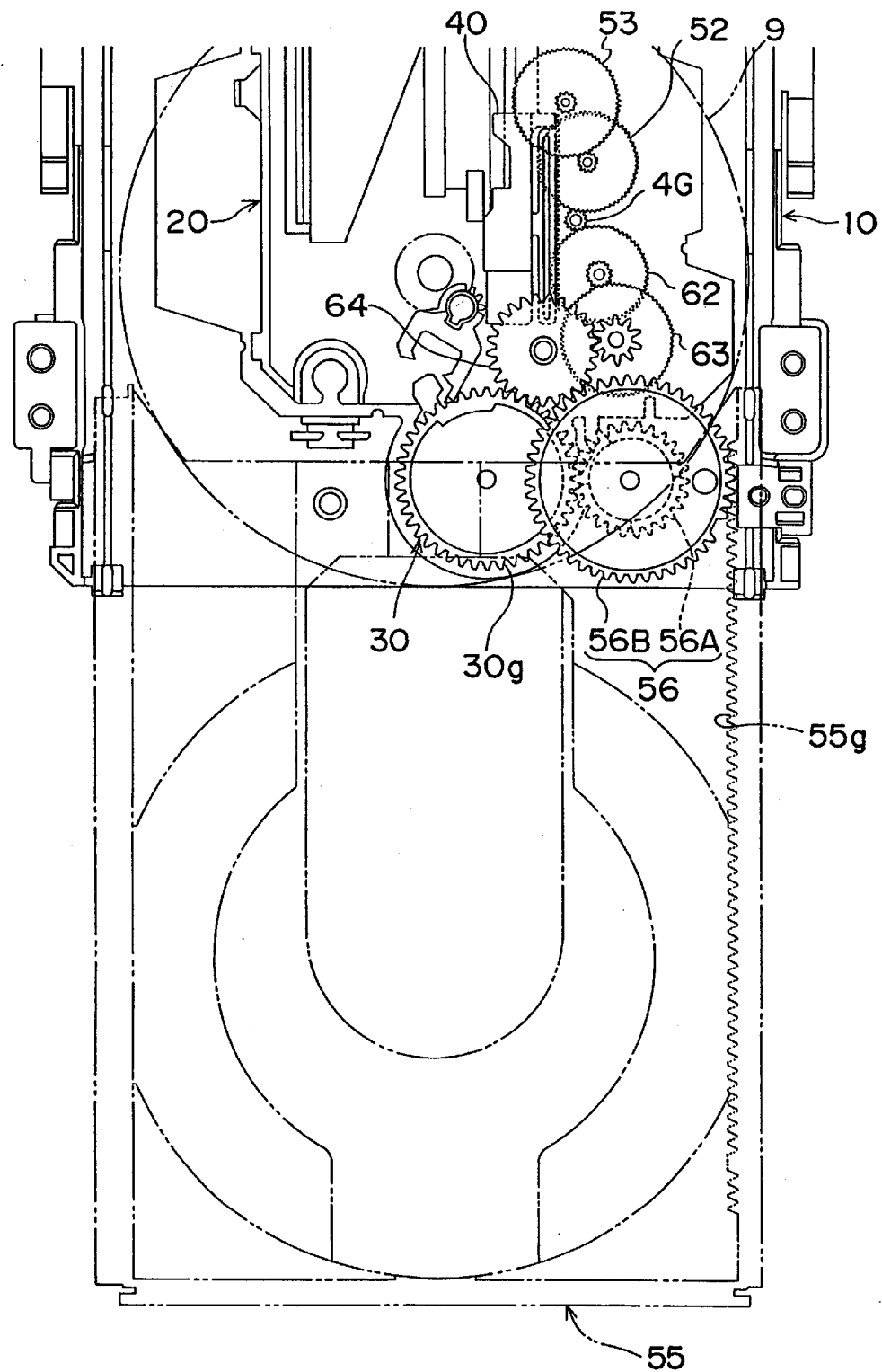
FIG. 21 is a plan view of the optical disk drive with the tray moved outside the drive.
Figure 22:
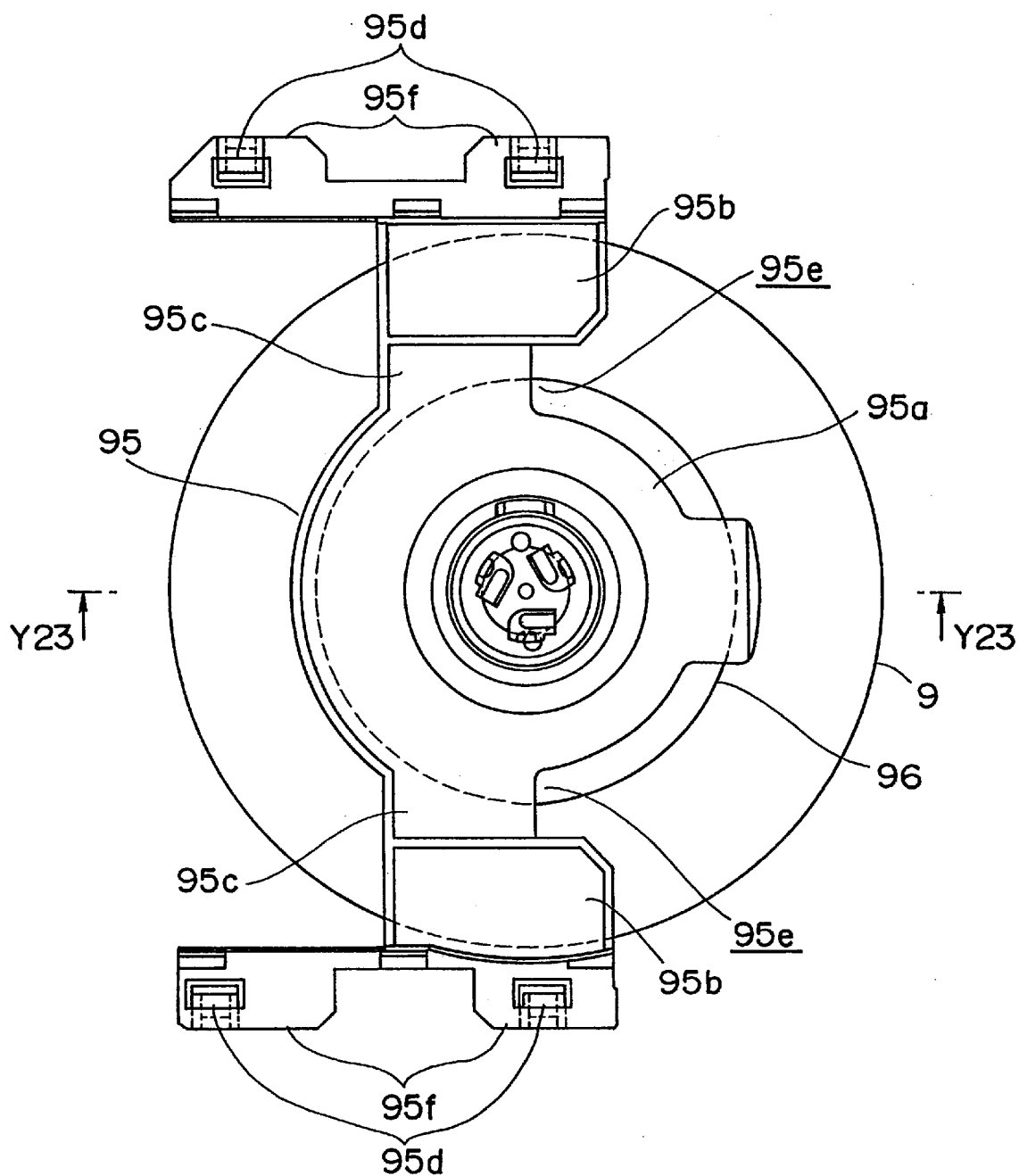
FIG. 22 is an enlarged plan view showing a disk clamping mechanism of the optical disk drive.
Figure 23:
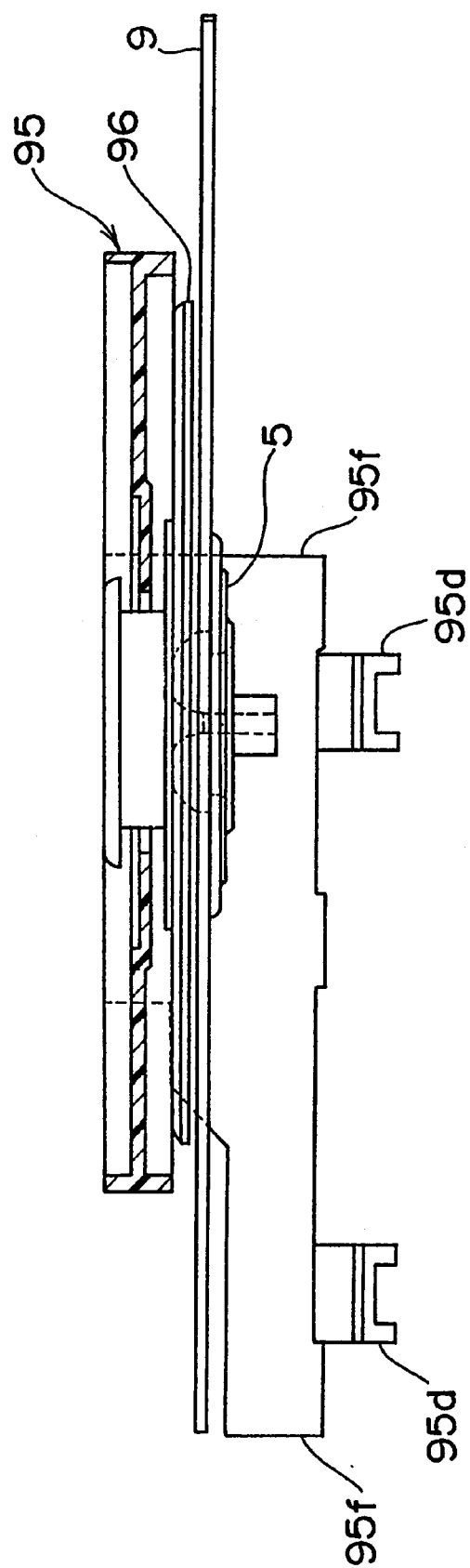
FIG. 23 is a vertical section view through line Y23—Y23 in FIG. 22.
Figure 24:
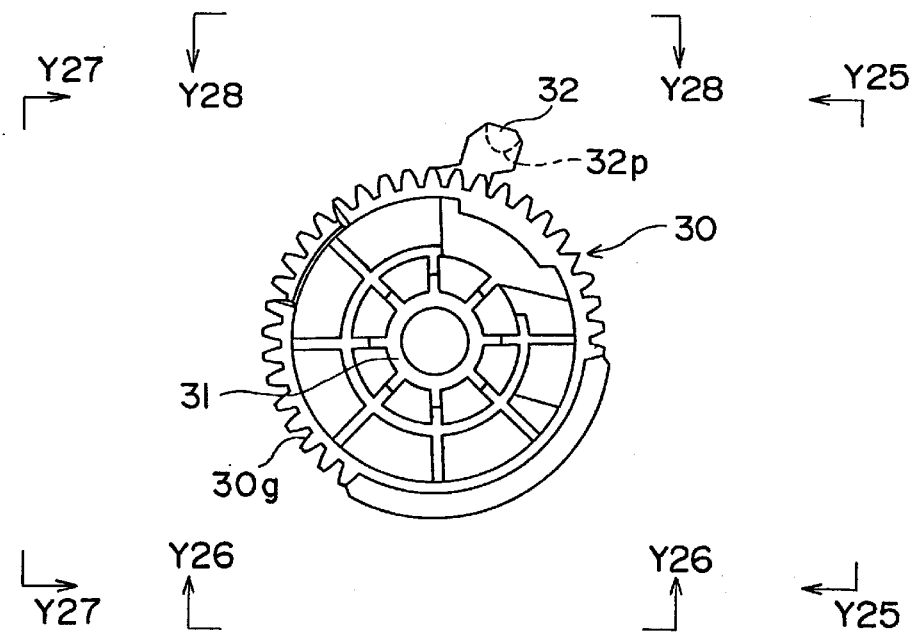
FIG. 24 is a plan view of a cam gear of the drive mechanism.
Figure 25:
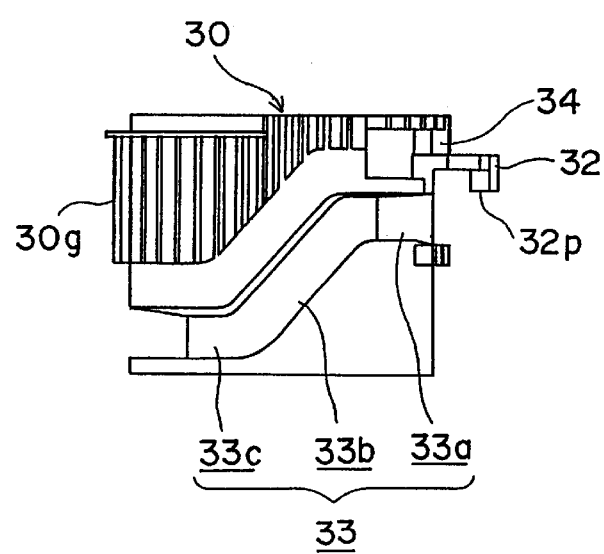
FIG. 25 is a side view of the cam gear shown in a direction of arrows Y25—Y25 in FIG. 24.
Figure 26:
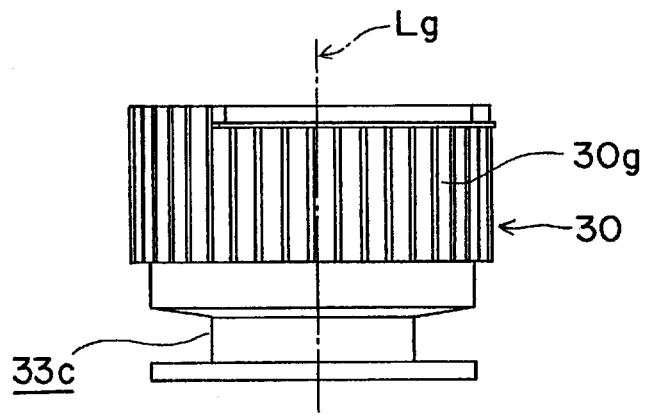
FIG. 26 is a side view of the cam gear shown in a direction of arrows Y26—Y26 in FIG. 24.
Figure 27:
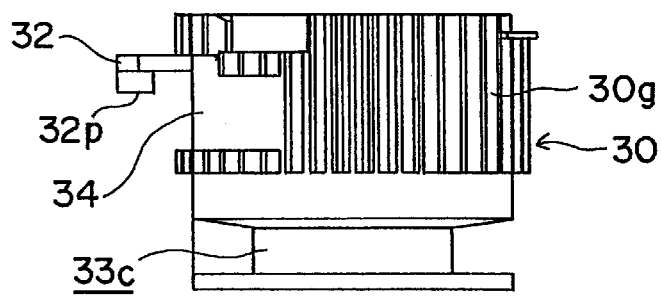
FIG. 27 is a side view of the cam gear shown in a direction of arrows Y27—Y27 in FIG. 24.
Figure 28:
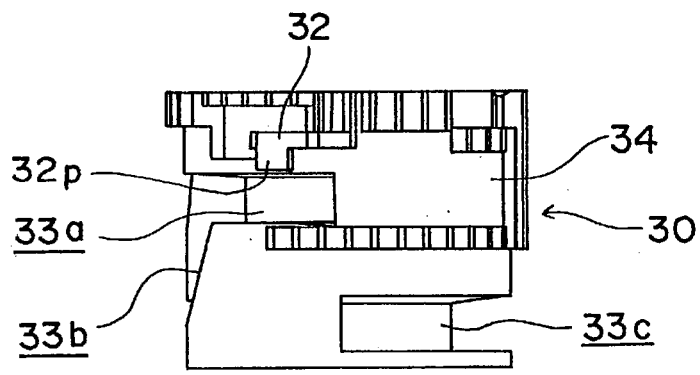
FIG. 28 is a side view of the cam gear shown in a direction of arrows Y28—Y28 in FIG. 24.

However, when the cam gear 30 turns to the position shown in FIG. 19 and FIG. 20, teeth 30g of cam gear 30 begin to engage input gear 56A of tray drive gear 56, and tray drive gear 56 turns in conjunction with rotation of the cam gear 30. The tray 55 is then pulled to the front as shown in FIG. 21 by way of output gear 56B of tray drive gear 56 and the tray rack teeth 55g engaged therewith.

It should be noted that drawing the tray 55 from inside the disk drive 1 to outside the drive, that is, unclamping the disc 9 and ejecting the disc 9 from a signal reproduction state, is described above. To draw the tray 55 from outside to inside the disk drive 1, the second motor 4 is driven in the opposite direction by the motor control circuit of the circuit board 2 so that the motor gear 4G begins to turn clockwise. As a result, carrying the optical disc 9 into the disk drive 1, clamping the disc, and preparing for signal reproduction are accomplished as a sequence of actions.

As described above, a disk drive according to this preferred embodiment of the present invention comprises a drive base 10 and separate traverse base 20 to which a turntable 5 is assembled with the traverse base 20 supported so as to swing up and down on the drive base 10. By driving a single motor (second motor 4) continuously in a forward direction (first direction of rotation) or opposite direction, moving an optical pickup 6, raising and lowering the turntable 5, and transporting a disc 9 can be accomplished substantially continuously in this order, or substantially continuously in the opposite order. It is therefore possible when loading or unloading a disc 9 to avoid interference with the turntable 5 without moving the disc 9 up or down. Unlike with a conventional disk drive, it is therefore not necessary to provide a disk holder for lifting the disk.

Furthermore, it is also possible to secure (clamp) and release (unclamp) the disc 9 to or from the turntable 5 using the operation whereby the traverse base 20 to which the turntable 5 is assembled is swung vertically on the drive base 10. Therefore, unlike with a conventional disk drive, it is not necessary to drive the clamping mechanism (chucking plate) up and down.

Furthermore, because a single motor (second motor 4) is used to move the optical pickup 6, raise and lower the turntable 5, and transport the disc 9, the disk drive 1 can be operated using a total of two motors, that is, said second motor 4 and a spindle motor (first motor) 3 for rotationally driving the turntable 5. By thus reducing the number of motors used, disk drive 1 construction is simplified, and good operation of the component parts can be more stably maintained.

As described above, a floating bushing 29 according to this preferred embodiment of the invention has first and second damping parts 29a and 29b, first and second fitting parts 29c and 29d, and movement limiting part 29f. It is therefore possible to provide a simple, space-saving, low cost flexible support device that can be disposed between the traverse base 20 and drive base 10 of an optical disk drive to support the entire weight of the traverse base 20, prevent the traverse base 20 from slipping vertically out of place, and effectively absorb vibration components and impact loads applied to the disk drive.

Furthermore, by providing a part that determines the center of rotation, an accurate center of circular movement can be assured without providing another center for circular movement.

Moreover, vibration and impact loads transferred from the drive base 10 to the traverse base 20 can be effectively absorbed, thus preventing the force of the impact or vibration from being directly transmitted from the drive base 10 to the traverse base side, and enabling the relative positions of the drive base 10 and traverse base 20, and components thereon, to be adjusted within the floating range of the traverse base 20.

A flexible support device according to the present invention is thus compact, structurally simple, and enables simple assembly. Moreover, the flexible support device achieves a stable damping characteristic even when the temperature rises, and accommodates good rotational movement.

Although the present invention has been described in connection with the preferred embodiments thereof with reference to the accompanying drawings, it will be obvious that various changes and modifications will be apparent to those skilled in the art without departing from the scope of the accompanying claims.

ADVANTAGES OF THE PRESENT INVENTION

A flexible support device according to the first aspect of the present invention has a second fitting part formed as an integral part of the flexible support device on the terminal side of a first or second flexible support part. This second fitting part is for fitting to a columnar supported part of a second member, this columnar supported part being passed through the center hollow part of the flexible support parts with the end thereof covered by the second fitting part. A movement limiting part is further formed as an integral part of either flexible support part and/or the second fitting part. When the flexible support device is installed with the second fitting part fit to the end of the columnar supported part, this movement limiting part engages the end of said supported part and thus limits movement of the second fitting part towards the end of the supported part.

When vibration force or an impact load causing relative displacement of a first member and second member is applied in a direction causing compression of the flexible support part to which the second fitting part is disposed, this load is carried by the end part of the columnar supported part through the intervening movement limiting part. When the flat supported part of a first member is greatly displaced toward the end of the columnar supported part of the second member, the movement limiting part limits movement of the second fitting part toward said end by being engaged with the end part of the columnar supported part. As a result, the flexible support device is prevented from slipping off the columnar supported part.

It is therefore not necessary to provide a separate end plate as a load bearing plate and to prevent flexible support device removal as it is with the above-noted related art. More specifically, after installing flexible support device between first and second members, it is not necessary to fasten a separate end plate to the end of the columnar supported part. Assembling this the flexible support device of the invention is therefore simple compared with the related art, and the number of parts and the number of assembly steps can be reduced. A flexible support device of the invention is therefore also advantageous as a means of holding down production cost.

In addition, because one side of the second fitting part is mounted so as to cover the end of the columnar supported part, one side of the flexible support device, that is, the side to which the second fitting part is formed, is free and unrestrained.

Compared with a conventional flexible support device disposed between an end plate and the base surface of a first member such that the overall length (height) thereof in the axial direction is limited by the end plate and opposing member, it is possible to reduce the length change in the axial direction of the flexible support device as a result of differences in the thermal expansion coefficients of the flexible support device and other parts when the temperature rises. A stable damping characteristic can therefore be achieved even when the temperature rises.

When a load is applied in a direction compressing the flexible support part at the terminal end of which is the second fitting part, a damping action accompanying compressive deformation within the elasticity limits of this one flexible support part is achieved. When the applied load compresses the other flexible support part, that is, the flexible support part to which the second fitting part is not provided, two damping actions are achieved: a damping action accompanying compressive deformation within the elasticity limits of this flexible support part, and a damping action accompanying strain within the elasticity limits of the flexible support part with the second fitting part suspended on the upthrusting end of the columnar supported part.

It is therefore possible to withstand an even greater load depending upon the direction in which the other flexible support part is compressed. That is, when a large load is expected to act in one direction, such large loads can be easily handled with a flexible support device having a simple, compact construction by setting this direction of the expected load to match the above-noted direction in which the other flexible support part is compressed.

As a result, compared with a conventional configuration in which flexible support parts perform independent damping actions depending upon the direction of an applied force, applied forces and loads, even when a particularly high load is expected in one direction, can be easily handled without incurring an increase in flexible support device size or an increase in structural complexity.

A flexible support device according to the second aspect of the present invention achieves essentially the same benefits as the first aspect described above. In addition, the shape of the outside edge of the end part of the columnar supported part is part of a circle when seen in vertical section, and the shape of the inside edge of the second fitting part, which is fit to said end part, is also part of a circle as seen in vertical section. Therefore, when the first and second members move circularly relative to each other, a significantly smoother motion can be achieved when compared with a conventional flexible support device having a flat end plate fastened to the end of the columnar supported part with the flexible support device disposed between this end plate and the base surface of the first member.

It is also not necessary in this case to provide a separate center of circular motion, and an accurate center of circular motion can be assured by simply fitting the second fitting part to the end of the columnar supported part.

A flexible support device according to the third aspect of the present invention achieves essentially the same benefits as the aspects described above. In addition, a plurality of protrusions directed toward the center of the inside circumference of second fitting part are formed on the inside surface of the second fitting part to maintain a gap between the inside circumference of the second fitting part and the outside circumference of the end of the columnar supported part. These protrusions enable an even smoother circular movement of the second fitting part to the end of the columnar supported part.

A flexible support device according to the fourth aspect of the present invention achieves essentially the same benefits as the aspects described above. In addition, the above-noted second member is the drive base used as the chassis of an optical disk drive, and the above-noted first member is a component base separate from the drive base of the same optical disk drive. This component base is rotatably supported to the drive base by means of a flexible support device of the invention so that the component base can move circularly vertically relative to the drive base. More specifically, this component base floats on the drive base by way of the flexible support device so that the flexible support device absorbs any vibrations or shock transferred from the drive base to the component base, and thereby prevents direct transfer of such vibration forces or impact loads to the component base side of the optical disk drive, and prevents major adverse effects thereto.

The flexible support device so disposed also enables the relative positions of the drive base and component base and any components thereon to be adjusted within the elasticity limits of the flexible support device. It is therefore possible to manufacture and assemble parts with somewhat less precision, and thereby improve productivity.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A flexible support device for optical disk drive disposed between a first member having a flat supported part, and a second member having a columnar supported part substantially orthogonal to the flat supported part of the first member, and being relatively displaceable relative to the first member at least in an axial direction of the columnar supported part, comprising:

first and second hollow flexible support parts disposed substantially coaxially and being flexibly displaceable relative to each other at least in said axial direction;

a first fitting part formed integrally between said first and second flexible support parts for fitting to the flat supported part of the first member;

a second fitting part formed integrally with a terminal side of either flexible support part for mounting on said columnar supported part of said second member, said columnar supported part passing through a hollow interior of said first and second flexible support parts; and a movement limiting part formed integrally with one said flexible support part and/or said second fitting part for limiting a movement of said second fitting part;

wherein said second fitting part is mounted covering an end part of said columnar supported part of said second member, and said movement limiting part engages said end part of said columnar supported part when the second fitting part is so mounted, and limits movement of the second fitting part in the direction of said end part.

2. A flexible support device as described in claim 1, wherein an outside edge profile of said end part of said columnar supported part of said second member forms a first partial circle profile when seen in section view, and an inside edge profile of said second fitting part forms a second partial circle profile when seen in section view.

3. A flexible support device as described in claim 2, wherein a plurality of protrusions is formed at an inside surface of said second fitting part, said protrusions being directed to a center of said second partial circle profile.

4. A flexible support device as described in claim 1, wherein said second member is a drive base used as a drive chassis of an optical disk drive; and said first member is a component base supported to move linearly or circularly vertically relative to and separately from said drive base.

* * * * *